United States Patent [19]

Nakamura et al.

[11] 3,995,610
[45] Dec. 7, 1976

[54] FOUR CYLINDER STRAIGHT-TYPE ENGINE WITH SECONDARY BALANCER SYSTEM

[75] Inventors: Hirokazu Nakamura; Mitsutaka Kinoshita, both of Kyoto; Tadahiko Ito, Nagaokakyo; Kazumasa Kawata, Kyoto, all of Japan

[73] Assignee: Mitsubishi Jidosha Kogyo Kabushiki Kaisha, Tokyo, Japan

[22] Filed: Nov. 27, 1974

[21] Appl. No.: 527,780

[30] Foreign Application Priority Data

Nov. 27, 1973 Japan .............................. 48-133873
Apr. 5, 1974 Japan .............................. 49-38665

[52] U.S. Cl. .............................. 123/192 B; 74/604
[51] Int. Cl.² ........................................ F22B 5/00
[58] Field of Search .................... 74/604; 123/192 B

[56] References Cited
UNITED STATES PATENTS 1,163,832  12/1915  Lanchester ..................... 123/192 B
3,511,110   5/1970  Grieve ................................ 74/604

Primary Examiner—William F. O'Dea
Assistant Examiner—Ronald C. Capossela
Attorney, Agent, or Firm—Sughrue, Rothwell, Mion, Zinn & Macpeak

[57] ABSTRACT

A four cylinder in-line engine is disclosed with a secondary balancer system, wherein at least one pair of balancer elements are arranged substantially at an identical horizontal distance from the longitudinal axes of the engine cylinders and on lines which are substantially parallel to the plane of the longitudinal axes. The distance taken between the axes of the paired balancer elements in the direction of the cylinder axes is determined at such desired values as to satisfy the engine usage and design. The paired balancer elements are rotated in the opposite directions to each other with a speed of rotation twice as high as that of the engine crackshaft, such that the lower balancer element is rotated in the opposite direction to that of the engine crackshaft.

14 Claims, 40 Drawing Figures

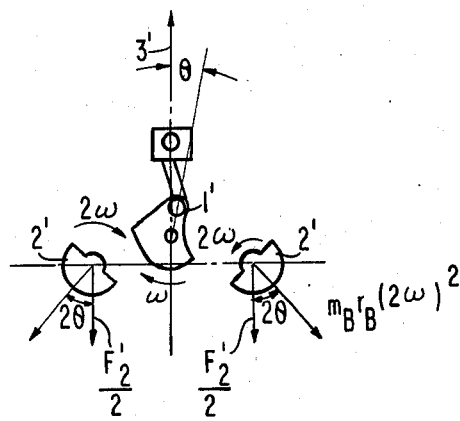
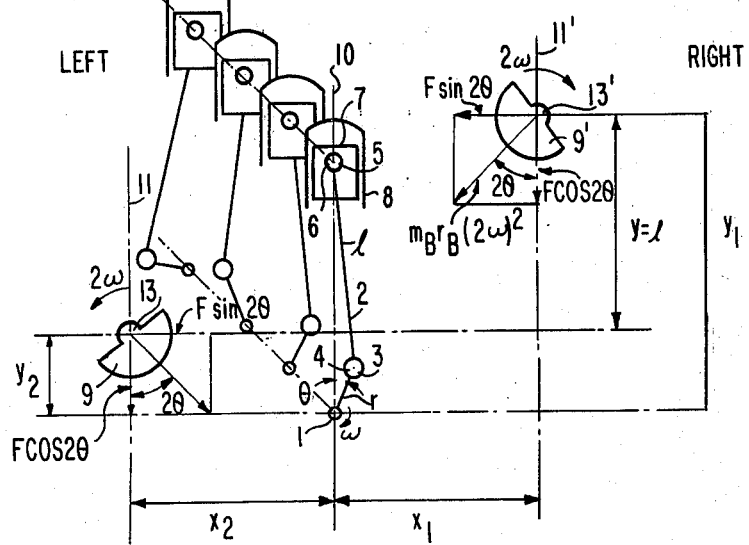

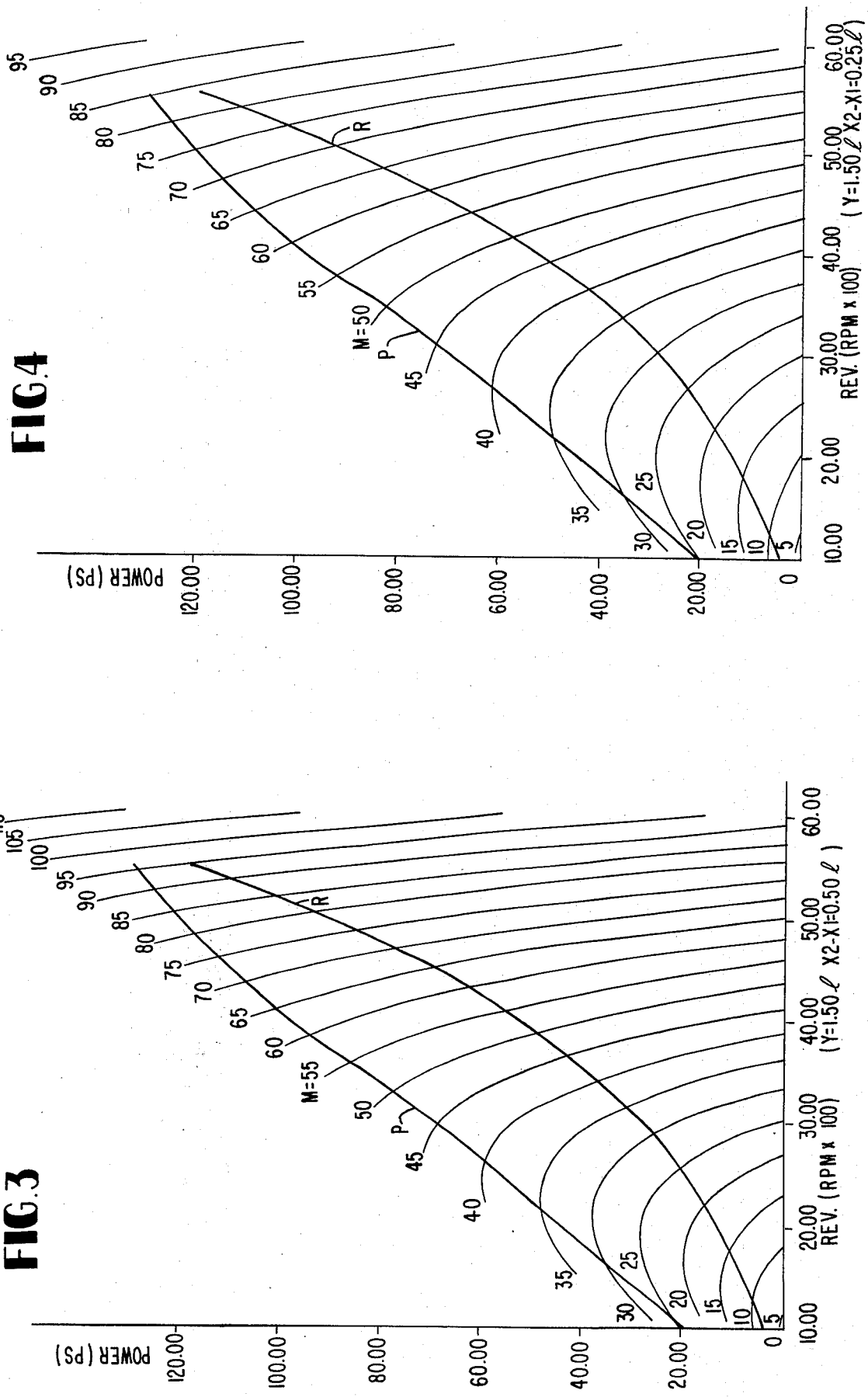

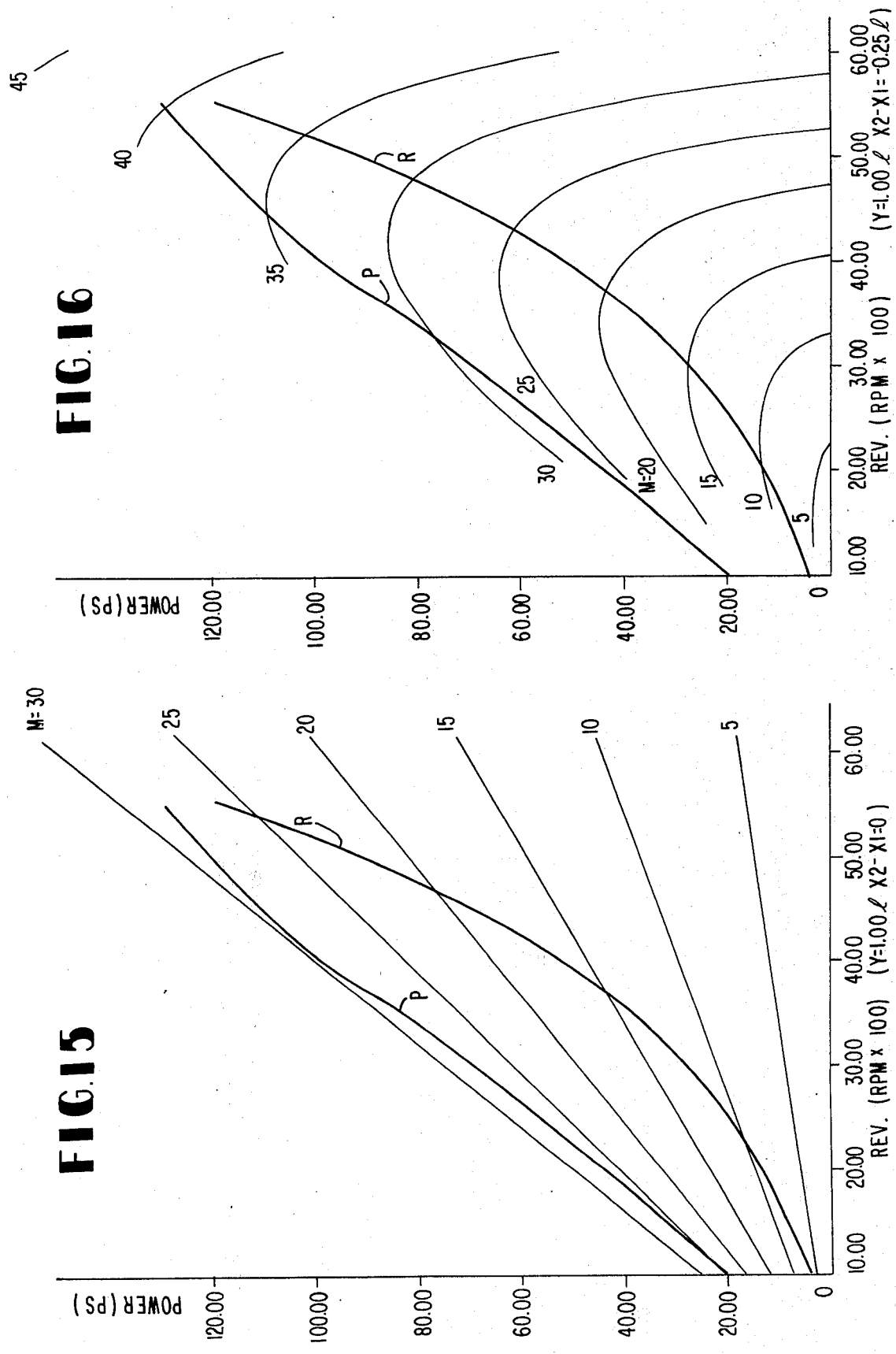

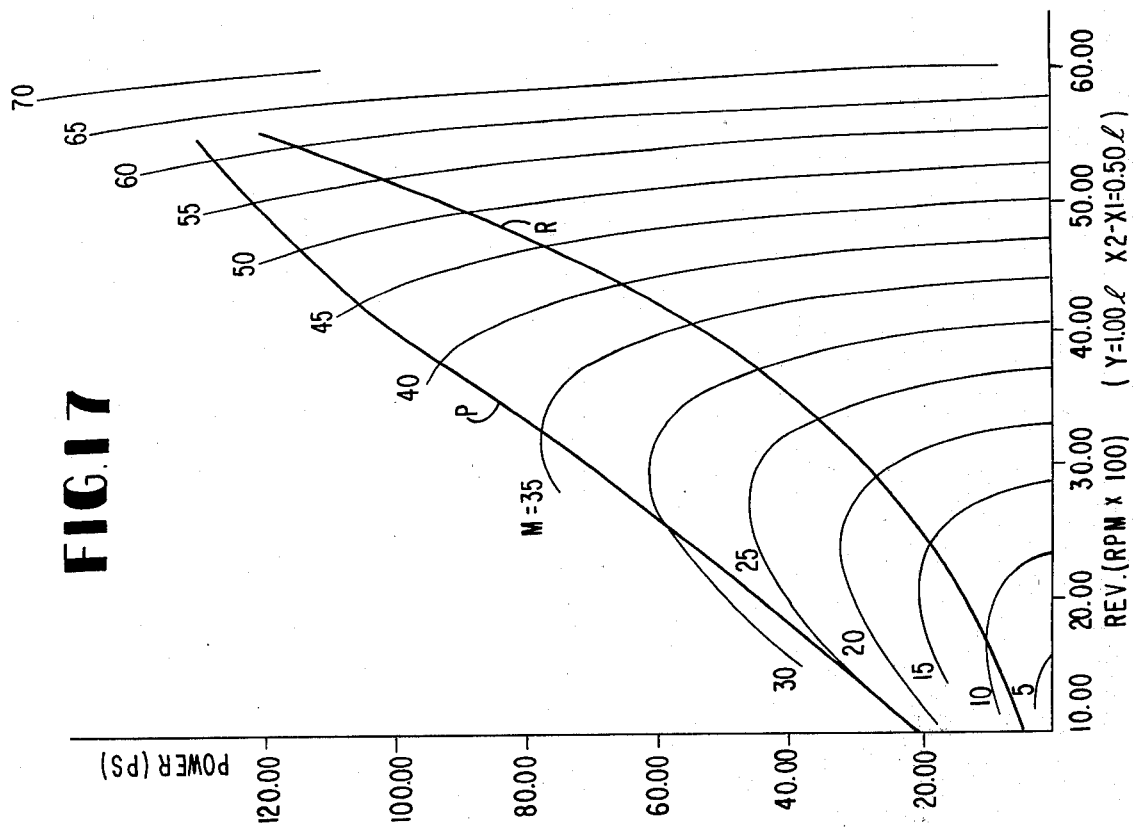
FIG.17 (Y=1.00ℓ  X2-X1=-0.50ℓ)
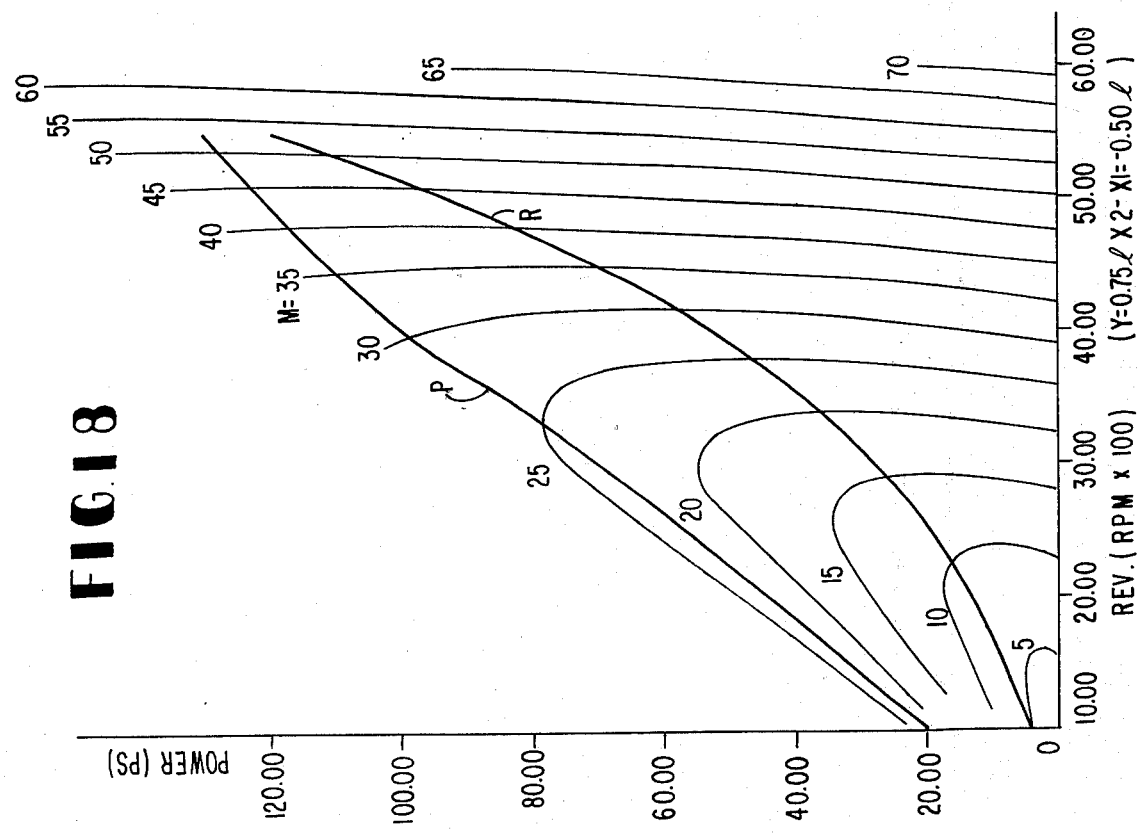
FIG.18 (Y=0.75ℓ  X2-X1=-0.50ℓ)

FOUR CYLINDER STRAIGHT-TYPE ENGINE WITH SECONDARY BALANCER SYSTEM

FIELD OF THE INVENTION

The present invention relates to a four cylinder in-line engine with a secondary balancer system, by which not only vertical secondary vibromotive forces but also secondary moments due to the reciprocating masses and the internal combustion explosion are eliminated.

Prior Art

In a four cylinder in-line engine, the following forces are well known in the art to cause vibration of the engine due to the reciprocating masses including:

a. a vibromotive force (mainly of secondary order);
b. a vibromotive moment due to the reciprocating masses (mainly of the secondary order); and
c. a vibromotive moment due to the internal explosion (mainly of the secondary order).

For an engine in an automotive vehicle of smaller or medium size, the vibromotive force is estimated about one ton, while the vibromotive moments are about one-half of the vibromotive force.

In order to damp the vibrations of such four cylinder in-line engine, there has been proposed and put into actual practice a system, by which the secondary component of the vibromotive force of the above item (a) or of the vertical vibromotive force due to the reciprocating masses can be eliminated. In an example of this system, a pair of balancer elements 2' and 2' are, as shown in FIG. 1, arranged substantially symmetrically relative to a cylinder axis 3'. The paired balancer elements 2' and 2' are rotated in the opposite directions to each other with a speed of rotation twice as high as that of an engine crankshaft, thus eliminating the vertical vibromotive forces.

First, the balance will be theoretically examined in the following. Here, if the vertical vibromotive force due to the reciprocating masses is assumed to be $F'_1$ while the vertical vibromotive force due to the balancer system $F'_2$, then in order to damp the vertical vibromotive force the two forces are required to satisfy the equation:

$$F'_1 + F'_2 = 0.$$

If, moreover, the forces are assumed to be positive in the vertically upward direction, then the force can be expressed by the following equation:

$$F'_1 = 4mr\omega^2 (C_2 \cos 2\theta + C_4 \cos 4\theta + \cdots),$$

where $$C_2 = \frac{1}{\lambda} + \frac{1}{4\lambda^3} + \cdots, \text{ and}$$

$$C_4 = -\frac{1}{4\lambda^3} - \frac{3}{16\lambda^5} \cdots.$$

The letter $\lambda$ ordinarily takes a value of 3 to 4, and the terms subsequent to $$\frac{1}{\lambda^3}$$

exert a small influence on the above equations.
Thus, the equation for $F'_1$ can be simplified as follows:

$$F'_1 = 4mr\omega^2 \frac{\cos 2\theta}{\lambda},$$

The equation for $F'_2$ above is $$F'_2 = -2m_B r_B (2\omega)^2 \cos 2\theta,$$

where the letter m indicates the reciprocating mass for one cylinder, the letter $\omega$ the angular velocity of rotation of the crankshaft, the letter r one-half of stroke of the piston, the letter $\theta$ the crack angle, the letter $\lambda = l/r$ the connecting rod ratio, the letter $l$ the length of the connecting rods, the letter $m_B$ is the mass of one balancer element, and the letter $r_B$ the distance between the center of rotation and the centroid of the balancer element.

Therefore, the summation of the forces $F'_1$ and $F'_2$ yields $$F'_1 + F'_2 = 4mr\omega^2 \frac{\cos 2\theta}{\lambda} - 2m_B r_B (2\omega)^2 \cos 2\theta,$$

and this summation has to be zero. Consequently, $m_B$ is expressed as $$m_B = \frac{mr}{2\lambda r_B}.$$

According to this equation, in order to eliminate the vertical vibromotive forces of a four cylinder in-line engine, it is sufficient that one pair of balancer elements, which have their unbalanced mass $m_B$ expressed as $$\frac{mr}{2\lambda r_B},$$

are rotated in the opposite directions to each other (in order to balance the horizontal forces) with a speed of rotation twice as high as that of the engine crankshaft.

As is easily understood from the foregoing description, in the case of actual practice, the vibromotive force of the item (a) due to the reciprocating masses can be eliminated. However such a balancer system cannot produce moments to counter the effects of vibromotive moments due to item (b) and (c). As a result, it has been considered impossible to set the four cylinder straight-type engine free from vibrations.

SUMMARY OF THE INVENTION

It is, therefore, an object to provide a four cylinder in-line engine of reciprocating type, in which the vibromotive moment of the items (b) and (c) can be balanced to zero with a resultant reduction in vibrations but with the engine performance being maintained at an excellent level.

According to the present invention, there is provided a four cylinder in-line engine with a secondary balancer system, which is characterized in that at least one pair of balancer elements is arranged substantially at an identical distance from a plane containing the londitudinal axes of the engine cylinders and on line which are substantially in parallel with said longitudinal axes, in that the distance taken between the axes of the paired balancer elements in a direction parallel to that of the cylinder axes is determined at such desired values as to satisfy the engine usage and design, and in that the paired balancer elements are rotated in the opposite direction to each other with a speed of rotation twice as high as that of the engine crankshaft in a manner that the lower balancer element is rotated in the opposite direction to that of the engine crankshaft. In the engine according to the present invention, moreover, the vibromotive moments due to the reciprocating masses and the combustion explosion, as well as the vertical vibromotive force of the conventional engine can be efficiently eliminated.

DESCRIPTION OF THE DRAWINGS

FIG. 1 shows a schematic diagram of the forces acting on the components of a reciprocating engine utilizing the prior art secondary balancer system;

FIG. 2 shows a schematic diagram of the forces acting on the components of a reciprocating engine utilizing a secondary balancer system according the present invention;

FIGS. 3–37 show graphical illustrations of equivibromotive moment diagrams for selected parameters;

DETAILED DESCRIPTION OF THE IVENTION

Figure 6:
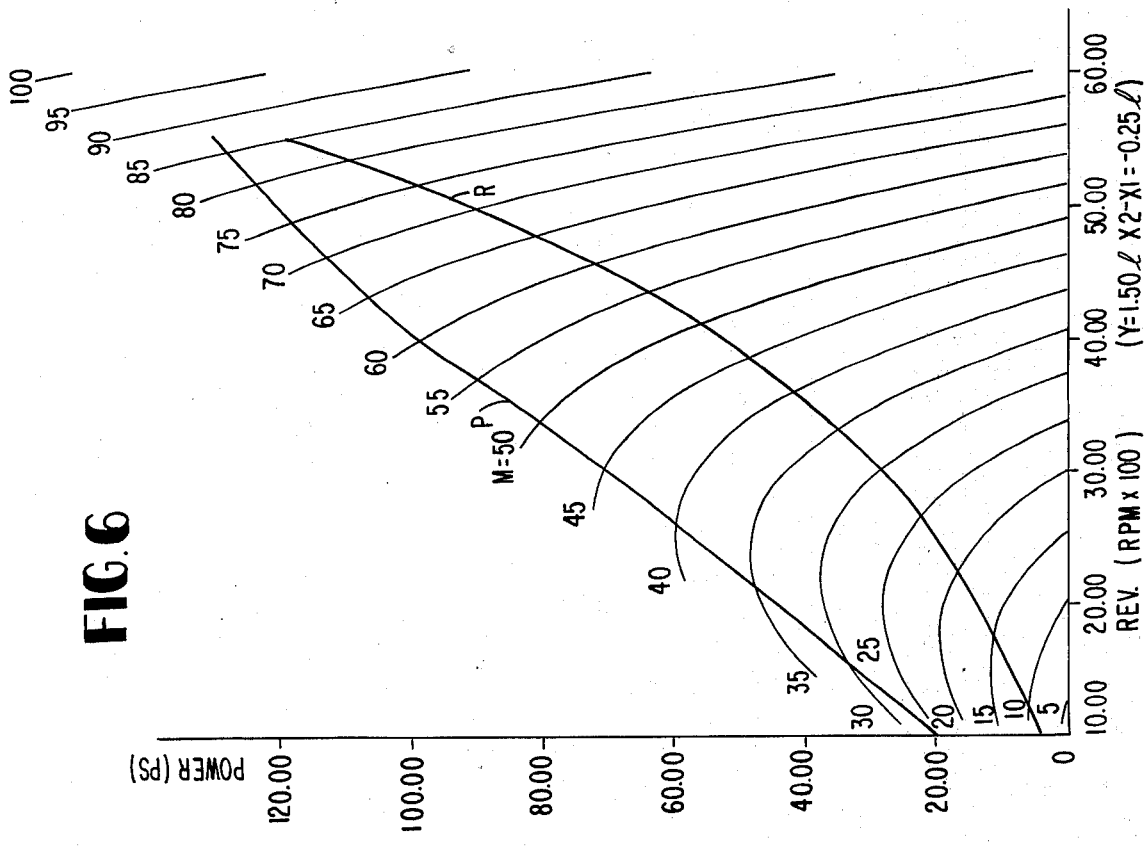

One embodiment of the present invention will be described in detail with reference to FIG. 2. Designated at reference numerals 1 and 2 are, respectively, a crankshaft and a connecting rod, the latter having its larger end 3 journaled to a pin 4 of the former and its smaller end 5 journaled to a piston 7 through a pin 6. Reference numeral 8 indicates the engine cylinder. Designated at reference numerals 9 and 9' are at least one pair of balancer elements, which are arranged substantially at an identical distance from the longitudinal axes 10 of the engine cylinders 8 and respectively on such lines 11 and 11' as are directed substantially in parallel with the longitudinal axes 10. Moreover, designated at reference numerals 13 and 13' are balancer shafts of the balancer elements 9 and 9', which shafts are made coactive with the crankshaft 1 by way of gears, sprocket chains or the like so that their speed of rotation may be twice as high as that of the crankshaft 1.

The four cylinder in-line engine according to the present invention has the aforedescribed construction arrangements, and its resultant effects will be detailed in the following.

If it is assumed for the straight-type four-cylinder engine that the moment of item (b) due to the reciprocating masses is $M_1$, that the moment of item (c) due to the combusion explosion is $M_2$, and that the countermoment due to the balancers is $M_3$, then these moments $M_1$, $M_2$ and $M_3$ are obtained from the following equations:

A. As to $M_1$

The moment $M_1$ due to the reciprocating masses of the straight-type four-cylinder engine is well known in the art to be expressed as: (Any of the moments will take a positive value in the direction of rotation of the crank shaft.)

$$M_1 = -4m_lr^2\omega^2 t_2\sin 2\theta - 4mr^2\omega^2 t_4\sin 4\theta, \cdots$$

where $t_2$ and $t_4$ are harmonic coefficients expressed as:

$$t_2 = -\frac{1}{2} - \frac{1}{32\lambda^4} \cdots$$

$$t_4 = -\frac{1}{4\lambda^2} - \frac{1}{8\lambda^4} \cdots .$$

B. As to $M_2$

As is also well known in the art, a torque curve is derived from an indicator diagram of the engine cylinder, and the curve thus obtained is then expanded into Fourier series to yield the torque T, as follows:

$$T = T_o + \pi D^2 r \left[(a_2\sin 2\theta + b_2\cos 2\theta) + (a_4\sin 4\theta + b_4\cos 4\theta) + \cdots \right]$$

where $T_o$ denotes an average torque;

$a_2$, $a_4$, $b_2$ and $b_4$ harmonic coefficients; and

D a bore diameter of the engine cylinders.

Since the amount $M_2$ due to the explosion is a reaction of the torque variation, it can be written as:

$$M_2 = -\pi D^2 r[(a_2\sin 2\theta + b_2\cos 2\theta) + (a_4\sin 4\theta + b_4\cos 4\theta) + \cdots]$$

C. As to $M_3$

The positions and rotational directions of the balancers are taken as shown in FIG. 2, and an unbalanced mass of one balancer is assumed to be $$m_B = \frac{mr}{2\lambda r_B}$$

so as to acquire the second-order balance of the vibromotive force of item (a). If the centrifugal force of one balancer is denoted by F, then F is expressed by the following equation:

$$F = m_B r_B (2\omega)^2 = \frac{2mr}{\lambda}\omega^2.$$

Then, the rolling moment of the righthand balancer 9' about the crankshaft is a summation of:

Moment due to the force in x direction which is:

$-Fy_1\sin 2\theta$; and

Moment due to the force in y direction which is:

$Fx_1\cos 2\theta.$

Therefore, the rolling moment $M_{3right}$ of the righthand balancer 9' becomes:

$$M_{3right} = -Fy_1\sin 2\theta + Fx_1\cos 2\theta.$$

Likewise, the rolling moment of the lefthand balancer 9 about the crankshaft is a summation of:

Moment due to the force in x direction which is:

$Fy_2\sin 2\theta$; and

Moment due to the force in y direction which is:

$-Fx_2\cos 2\theta.$

Thus, the rolling moment $M_{3left}$ of the lefthand balancer becomes:

$$M_{3left} = Fy_2\sin 2\theta - Fx_2\cos 2\theta.$$

Therefore, the rolling moment $M_3$ of the both balancers can be expressed as follows:

$$M_3 = M_{3right} + M_{3left} = -F[(y_1 - y_2)\sin 2\theta + (x_2-x_1)\cos 2\theta]$$

Here, if the relation $y_1 - y_2 = y(y>0)$ is substituted into the above equation, then the equation of $M_3$ is rewritten as follows:

$$M_3 = -F[y \sin 2\theta + (x_2 - x_1)\cos 2\theta]$$
$$= -\frac{2mr}{\lambda} \omega^2 [y \sin 2\theta + (x_2 - x_1)\cos 2\theta].$$

As a result, the summed vibromotive moment $M$ of the engine as a whole is obtained:

$$M = M_1 + M_2 + M_3$$
$$= (-4mr^2\omega^2 t_2 \sin 2\theta - 4mr^2\omega^2 t_4 \sin 4\theta - \cdots)$$
$$- \pi D^2 r [(a_2 \sin 2\theta + b_2 \cos 2\theta) + (a_4 \sin 4\theta + b_4 \cos 4\theta) + \cdots]$$
$$- \frac{2mr}{\lambda} \omega^2 [y \sin 2\theta + (x_2 - x_1)\cos 2\theta].$$

In the above equation, only the terms of the second order are taken into consideration, because the terms of the higher orders have less influences and accordingly are omitted. From this consideration, the equation of the vibromotive moment $M$ is obtained in a simplified form:

$$M = \left(2mr^2\omega^2 - \pi D^2 r a_2 - \frac{2mr\omega^2}{\lambda} y\right) \sin 2\theta + \left[-\pi D^2 r b_2 - \frac{2mr\omega^2}{\lambda}(x_2 - x_1)\right] \cos 2\theta$$

$$= \sqrt{\left(2mr^2\omega^2 - \pi D^2 a_2 - \frac{2mr}{\lambda} \omega^2 y\right)^2 + \left[-\pi D^2 r b_2 - \frac{2mr}{\lambda} \omega^2 (x_2 - x_1)\right]^2} \times \sin(2\theta + \alpha).$$

where $$\alpha = \tan^{-1} \frac{-\pi D^2 r b_2 - \frac{2mr}{\lambda} \omega^2 (x_2 - x_1)}{2mr^2\omega^2 - \pi D^2 r a_2 - \frac{2mr}{\lambda} \omega^2 y}$$

Figure 38:
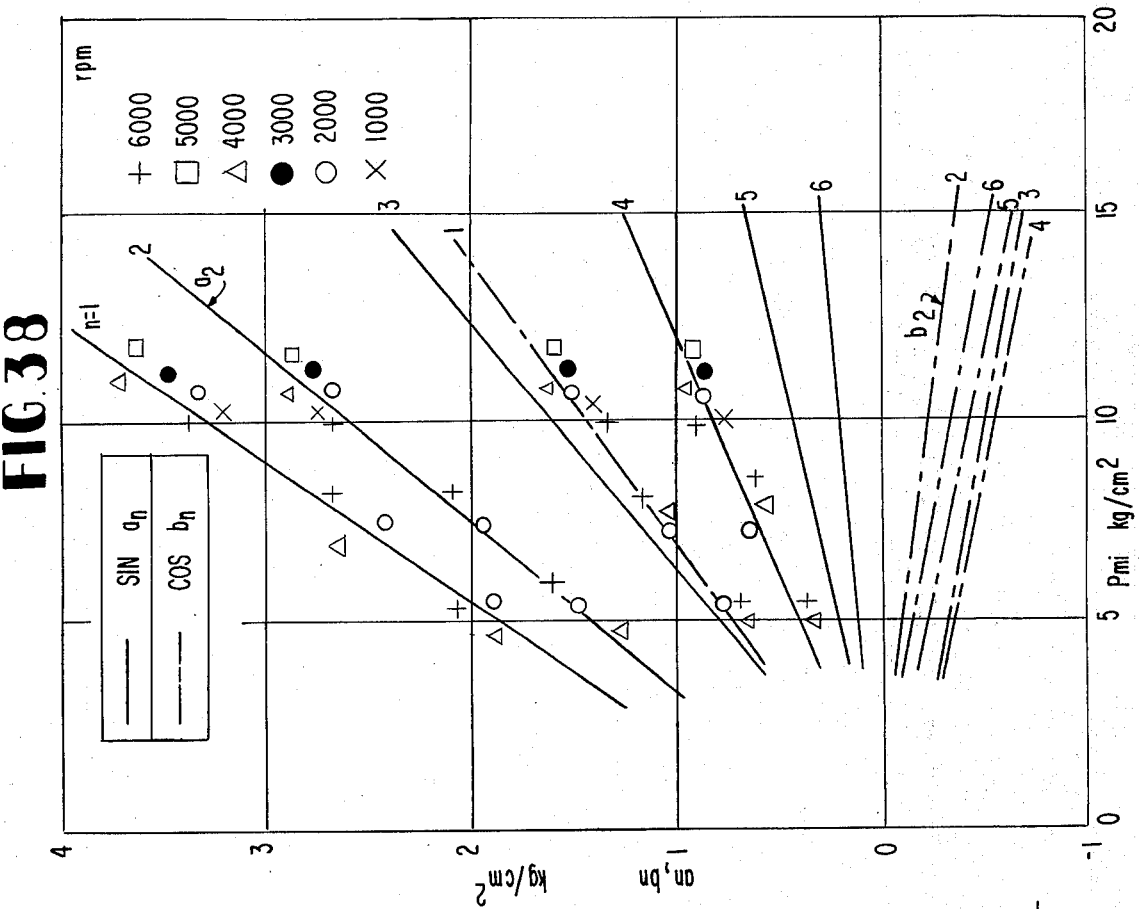
FIG. 38 is a graph showing harmonic coefficients for the torque generated by the combustion explosion.
Figure 37:
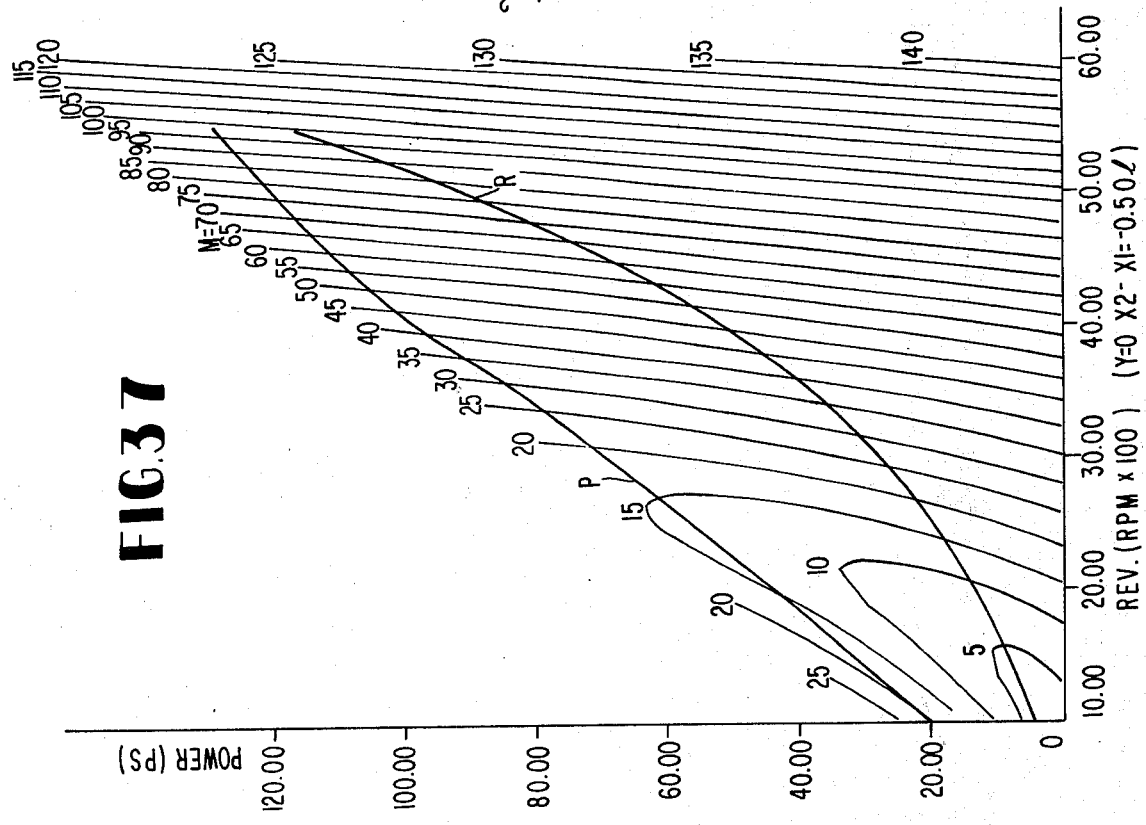

In order to reduce the vibromotive moments as much as possible, the balancers have to be so positioned that the value $M$ takes its minimum in terms of the parameters $y$, $x_1$ and $x_2$. For this requirement, a series of experiments were conducted with use of a four-cylinder internal combustion engine, which has the total piston displacement of 1,995 cc, the reciprocating mass m of 795 g, the crank radius $r$ of 45 mm, the length $l$ of the connecting rods of 166 mm, the bore diameter D of 84 mm, and the connecting rod ratio $\lambda$ of 3.688. The results of these experiments are shown, using suitable values for the parameters $y$, $x_1$ and $x_2$, in FIGS. 3 to 37, in which the equi-vibromotive-diagrams are drawn for the selected values of the parameters. In FIGS. 3 to 37, the abscissa indicates the rotational speed of the engine, while the ordinate indicates the engine output power. Here, the harmonic coefficients of the second order of the combustion explosion torque are determined by reading the desired values for the mean effective pressures $P_{mi}$, which are plotted from the experimental data in FIG. 38. In this regard, the relationship between the shown mean effective pressures and the shown horse powers is derived from the following equation:

$$H = \frac{P_{mi} \cdot VN}{9 \times 10^5}$$

where $H$ indicates the shown horse power (PS), $V$ the total piston displacement (cc), $N$ the rotational speed of the engine (r.p.m.), and $P_{mi}$ the shown mean effective pressures (Kg/cm$^2$).

In the equi-vibromotive-moment diagrams of FIGS. 3 to 37, reference letter M indicates the vibromotive moment, $p$ the output power of the four-cylinder internal combustion engine for use in our experiments, and R the curves showing the running resistances during the cruising condition of the automobile, on which the engine is installed. The parenthesized data ($y = 0$, $x_2 - x_1 = 0$), as appearing below the abscissa of the above drawings, for example, FIG. 35, mean that for $y=0$, the distance between the axes of the paired balancers in the axial direction of the engine cylinders is zero, namely, that the axes of the balancers are arranged horizontally. For $x_2-x_1 = 0$, the data mean that the paired balancers are arranged at an equal distance from the plane containing the longitudinal axis of the engine cylinder and axis of the crankshft.

Figure 5:
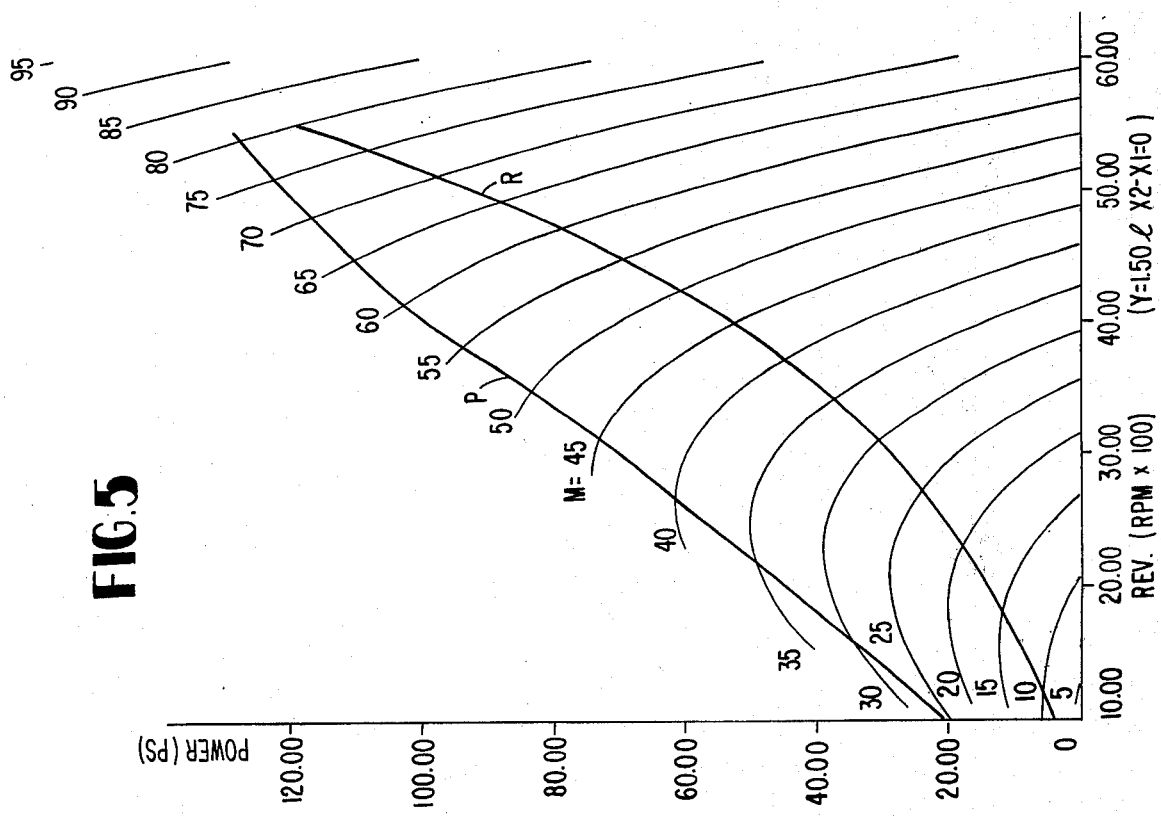
Figure 7:
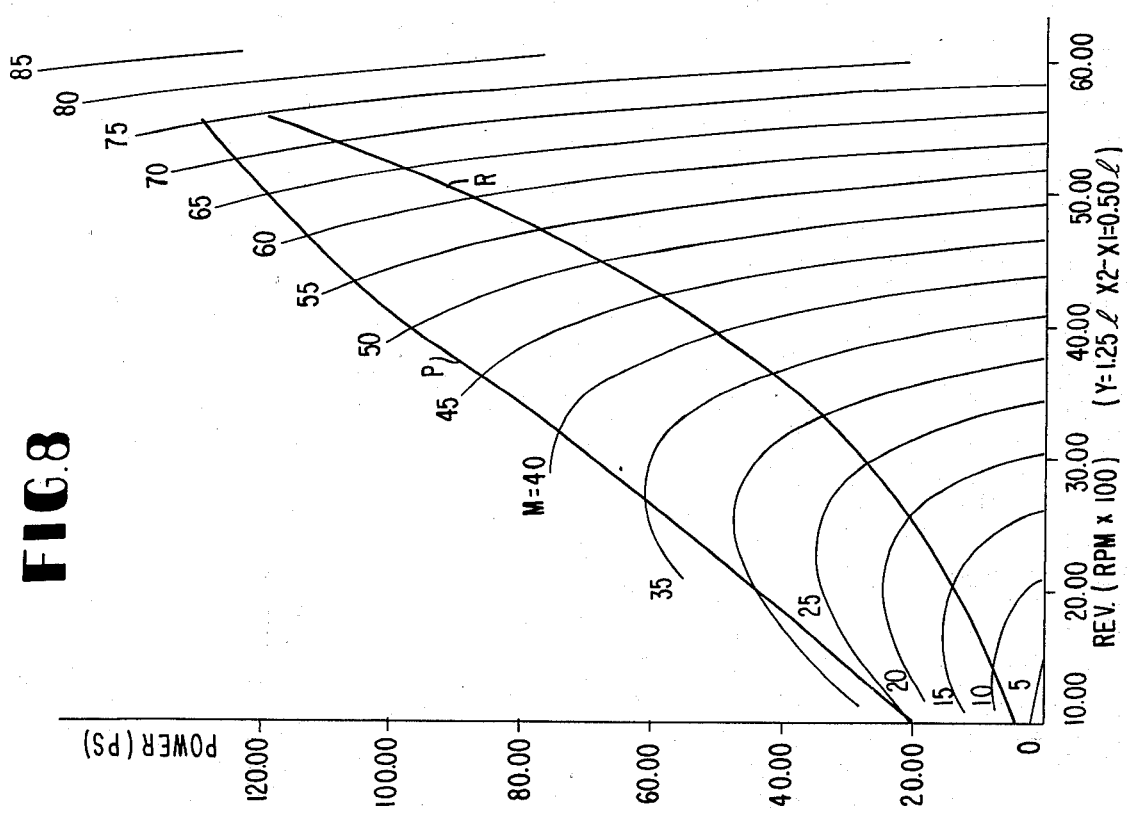
Figure 8:
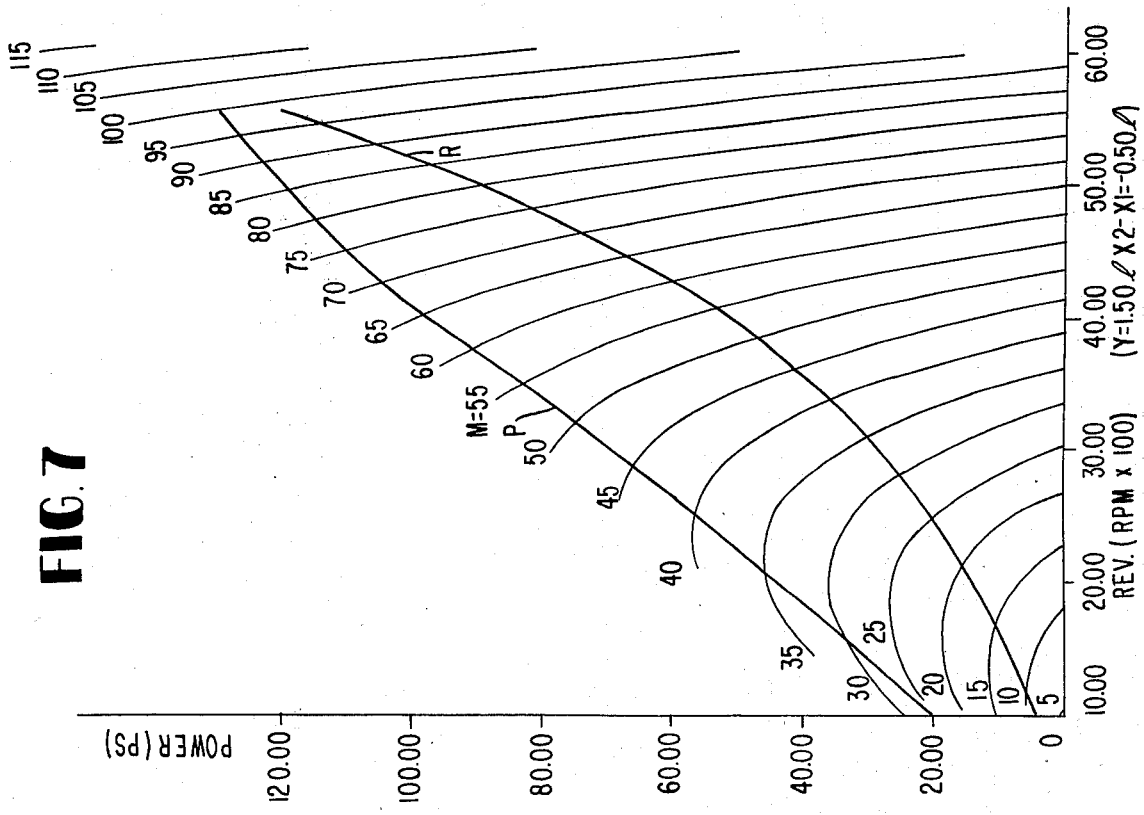
Figure 10:
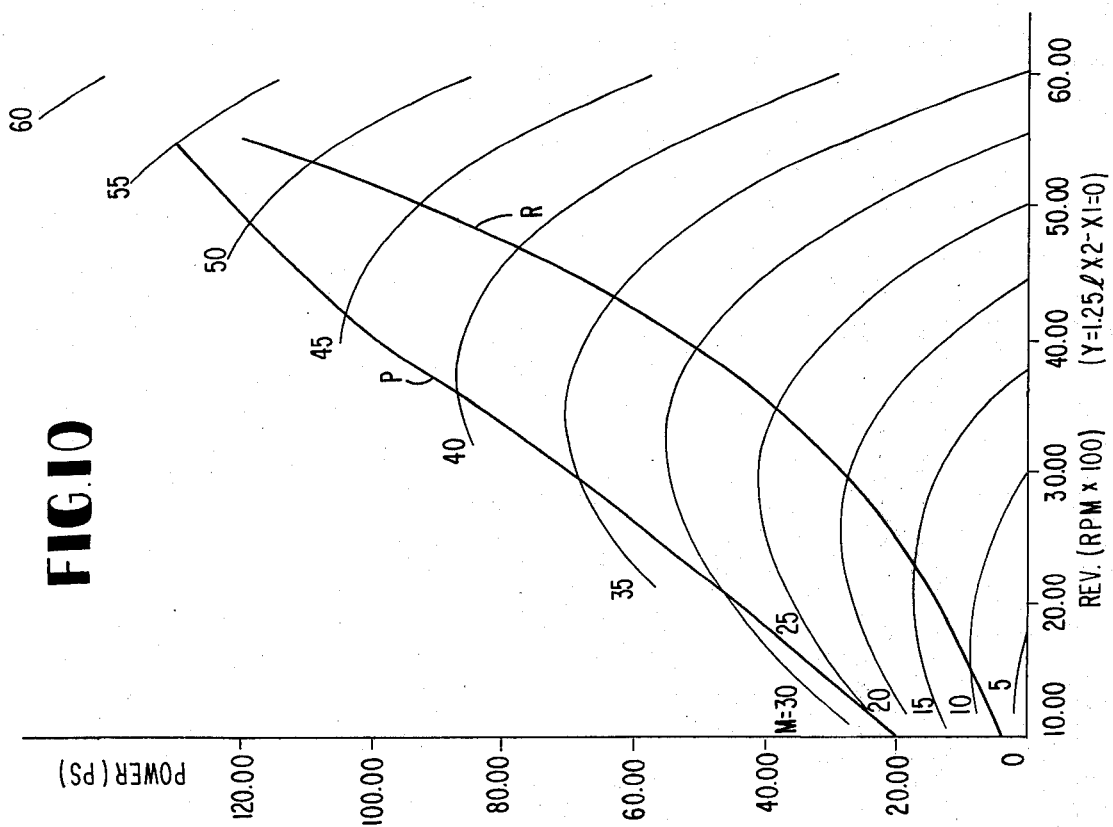
Figure 9:
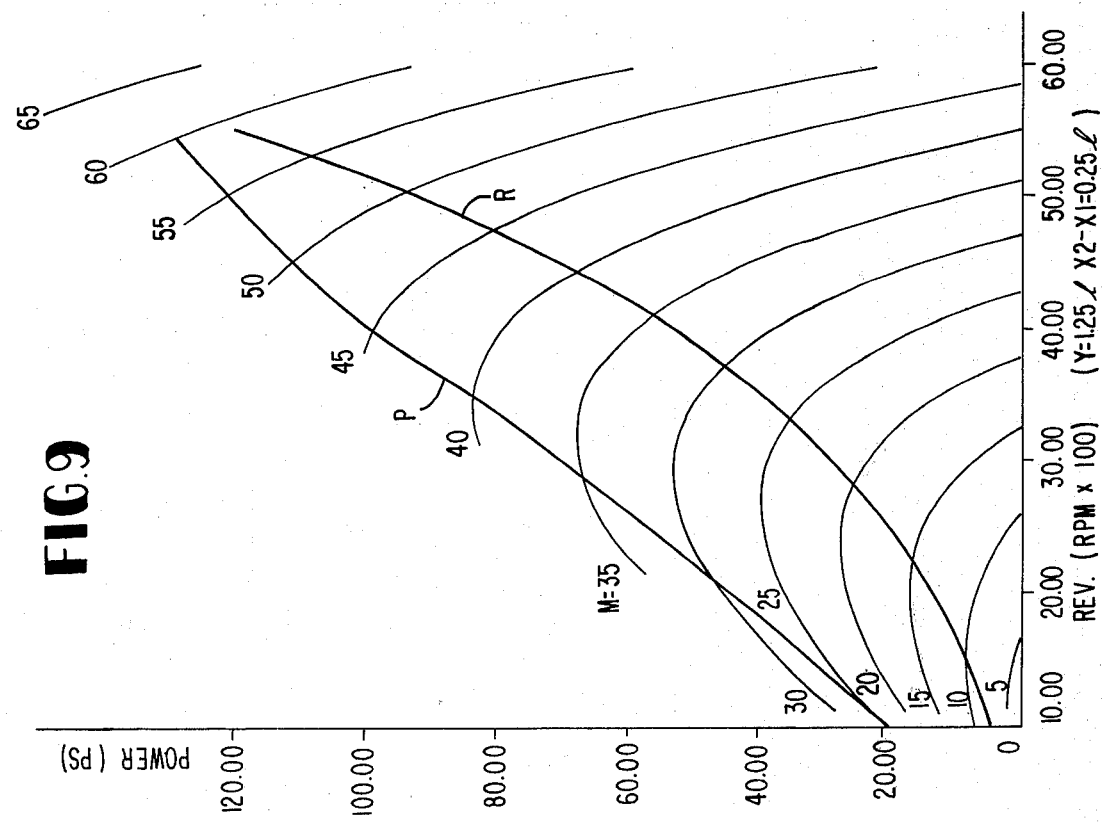
Figure 12:
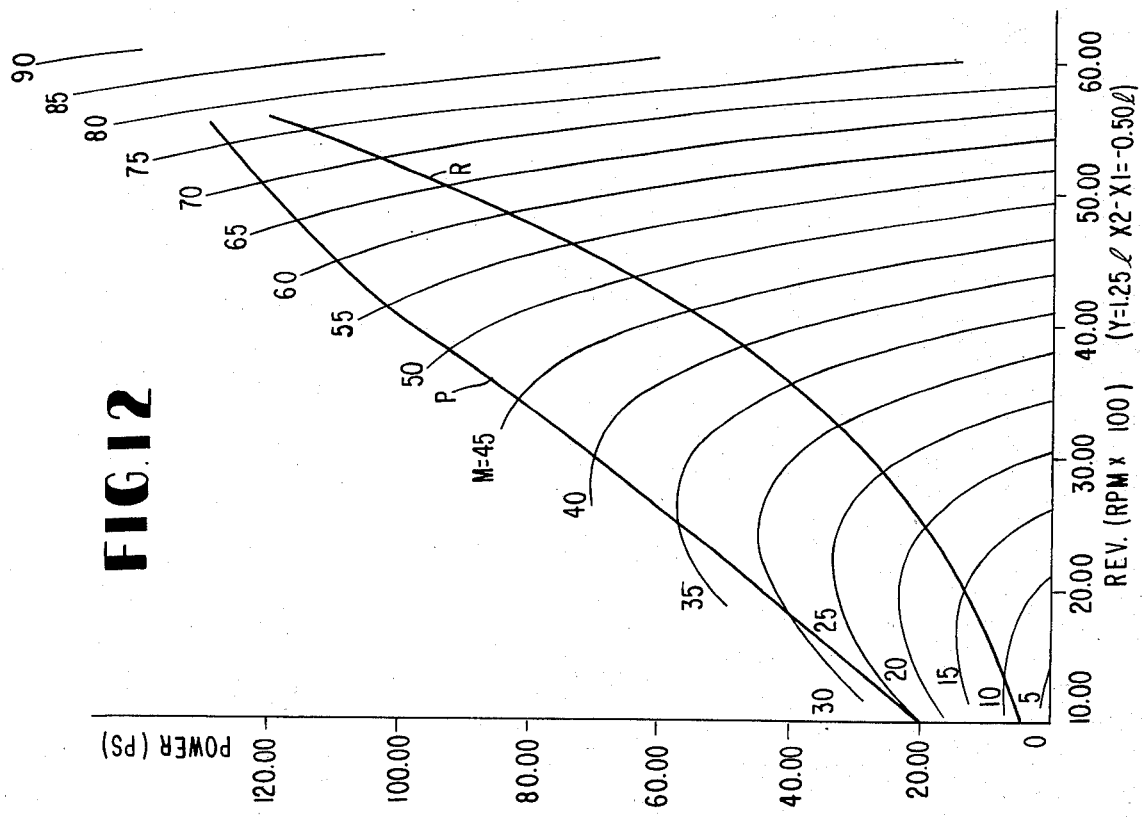
Figure 11:
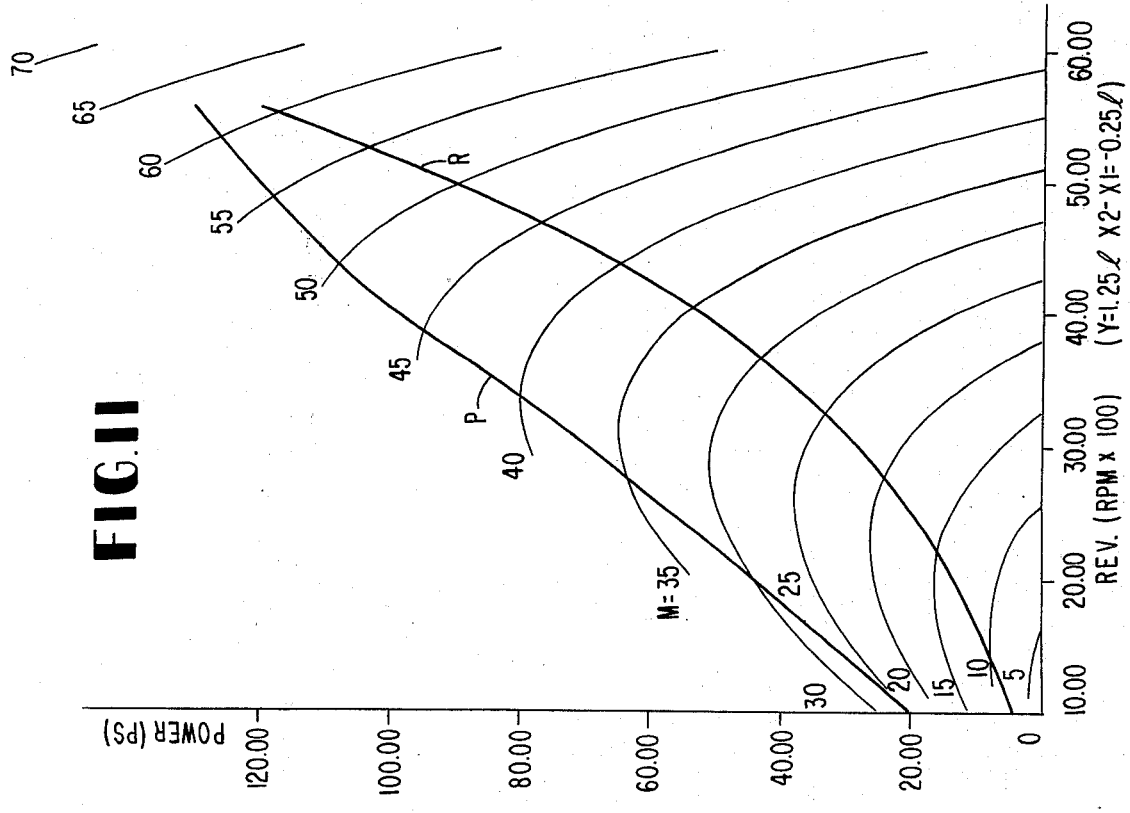
Figure 14:
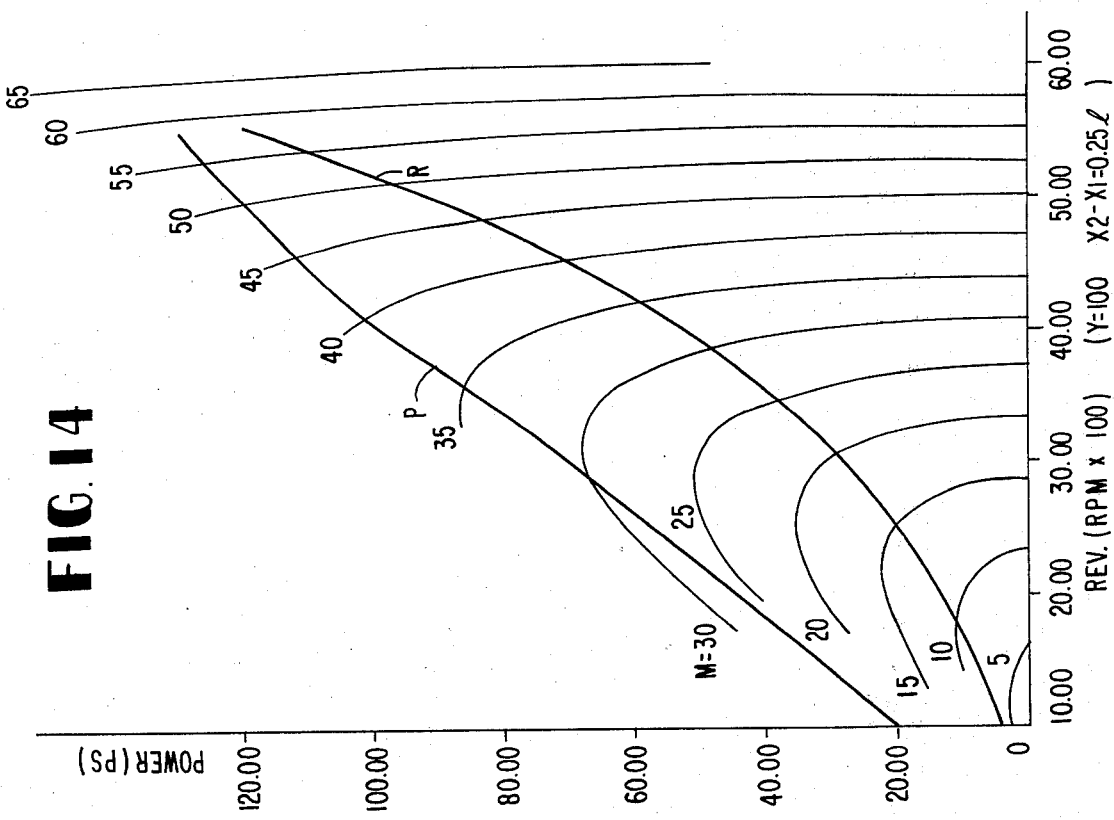
Figure 13:
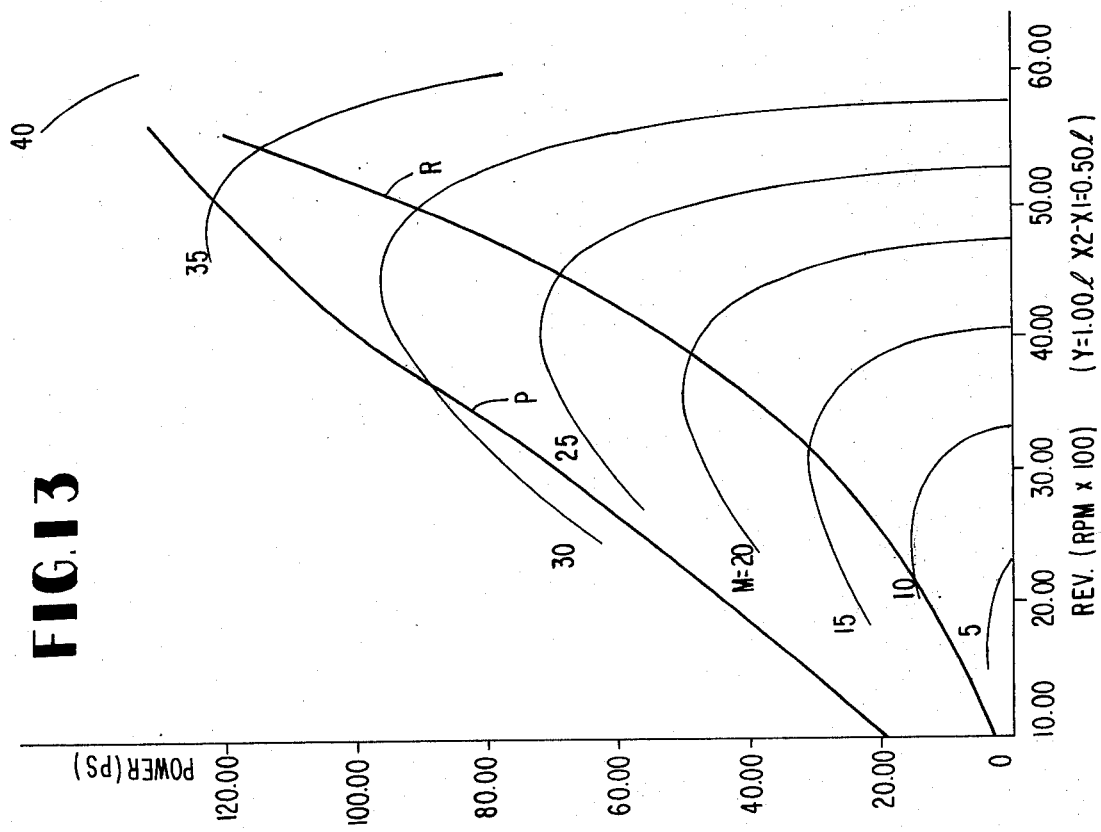

The behavior of the vibromotive moment M will now be examined in conjunction with FIG. 5, by way of example only. From this examination, it will be found that the vibromotive moment takes its minimum value in the neighborhood of M = 5 and increases sideway in the fashion 10, 15, 20, 25.

In accordance with such examination, therefore, the most suitable position of the balancers can be determined for the selected running ranges, respectively, of the automobile engine and of the motor truck engine.

For the automobile engine which is most often used in the running resistance range during the cruising operation, for instance, if the balancers are so positioned that the resistance range may fall under range, in which the engine vibrations take their minimum value, then it is possible to obtain an automobile engine, which has remarkably reduced vibrations over a wide driving range from high to low speed range, without drastically reforming the construction of the conventional reciprocating engine.

Figure 20:
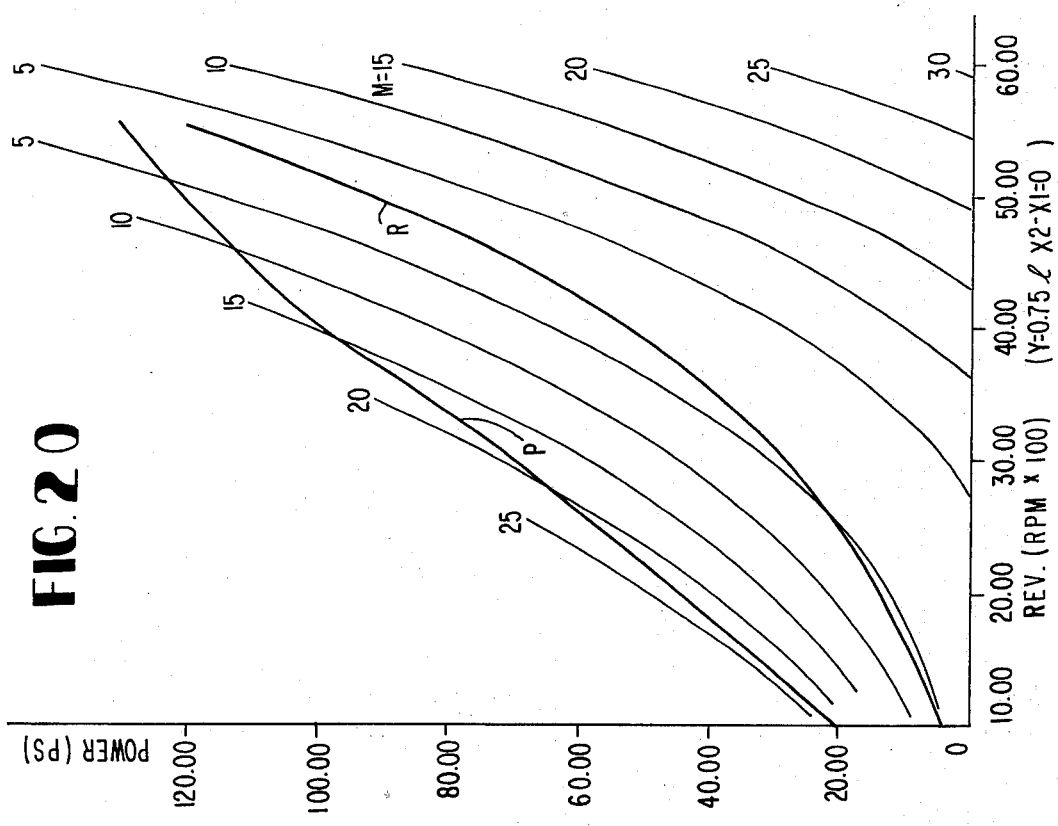
Figure 19:
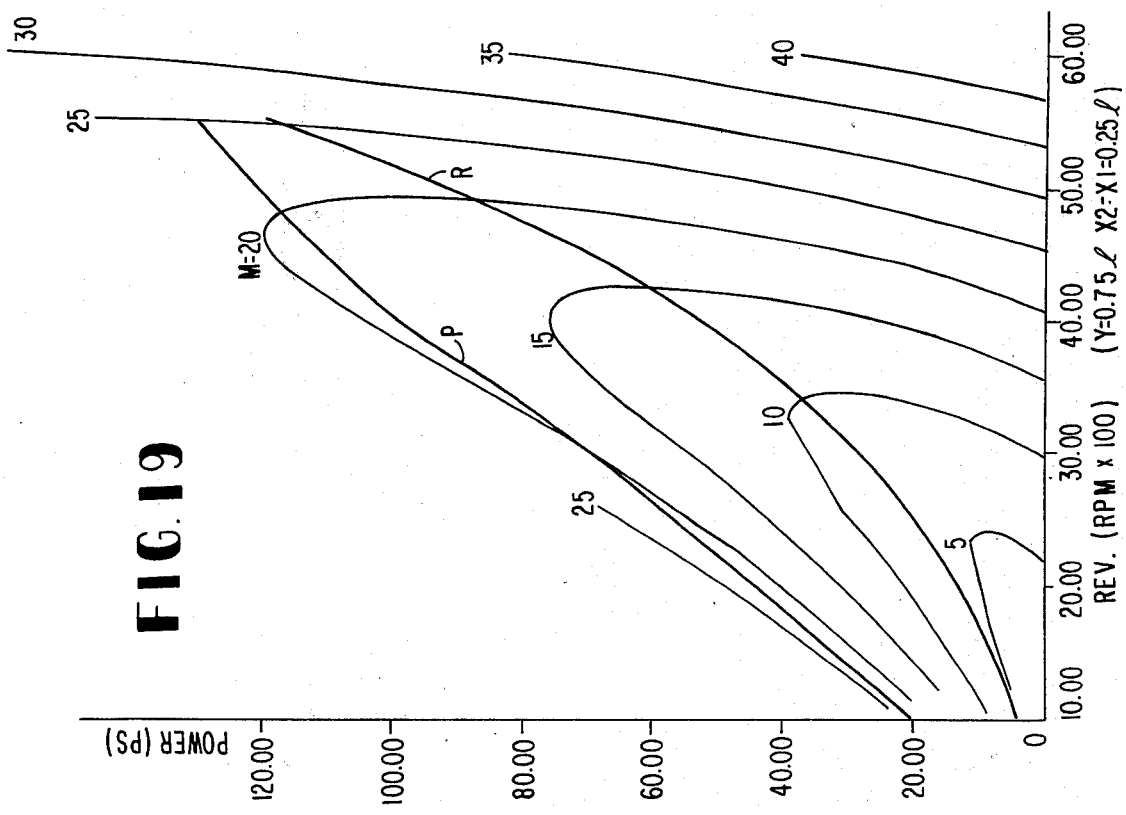
Figure 22:
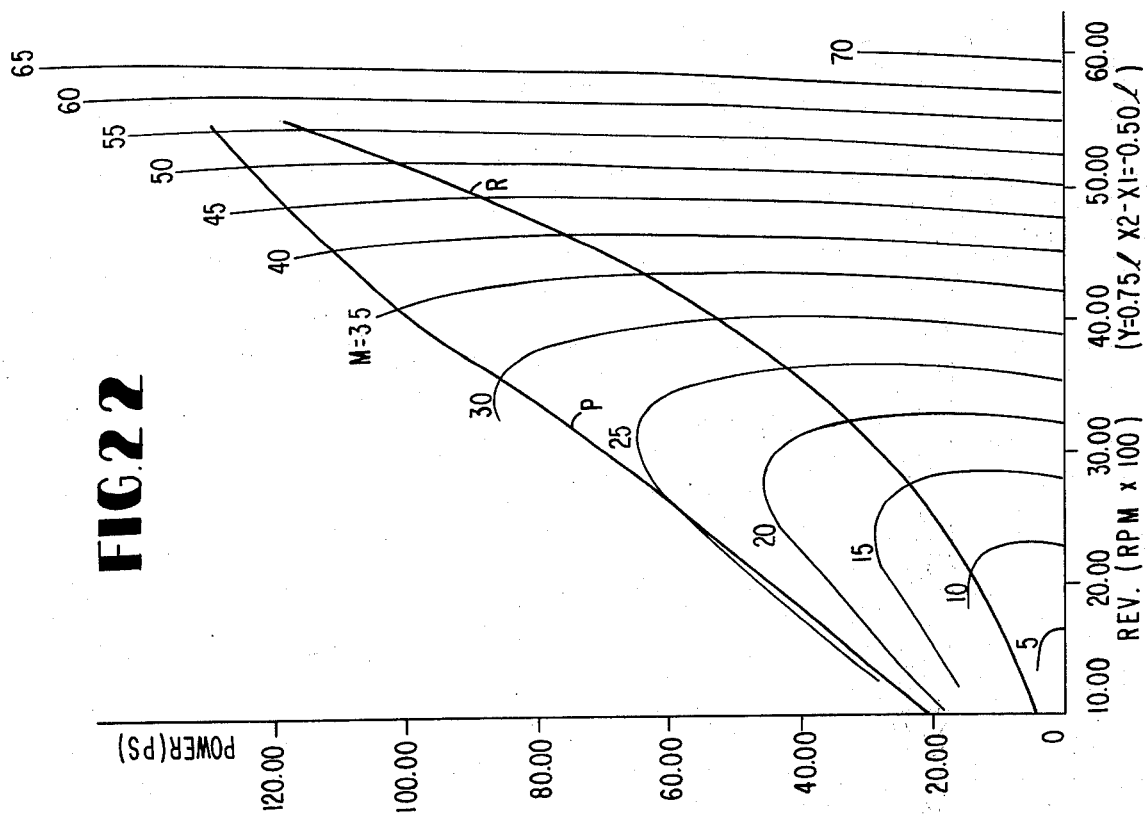
Figure 21:
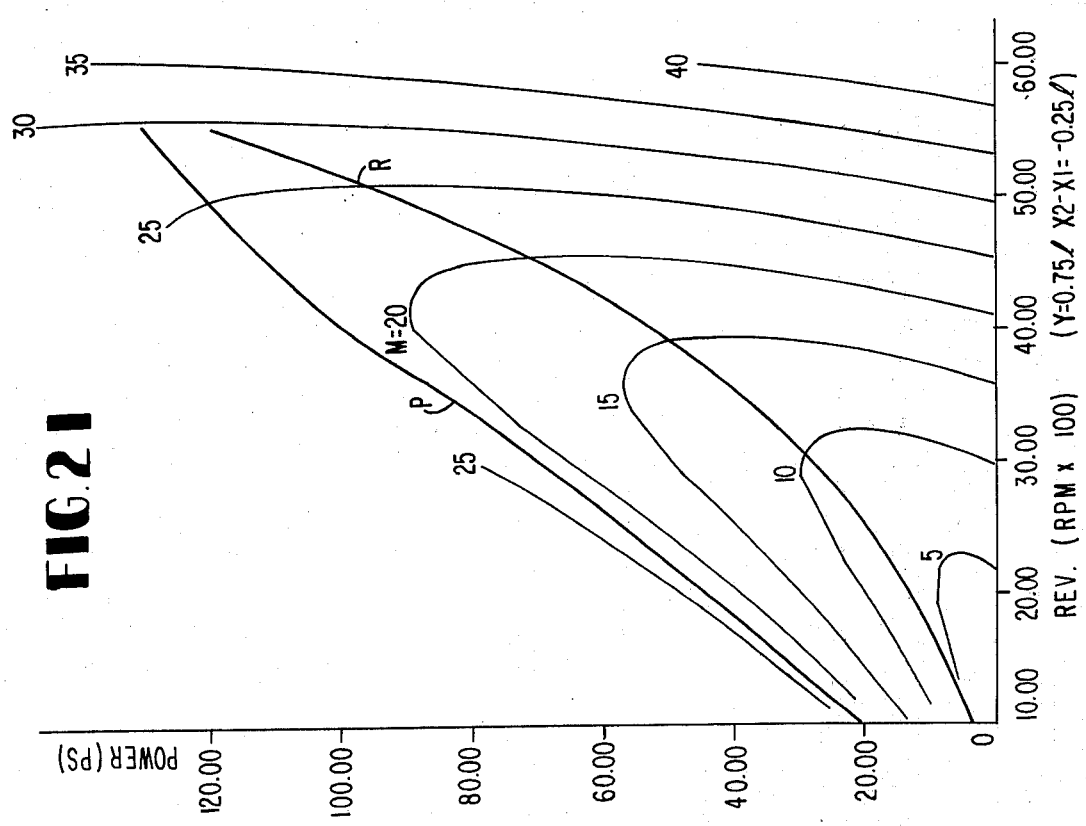
Figure 24:
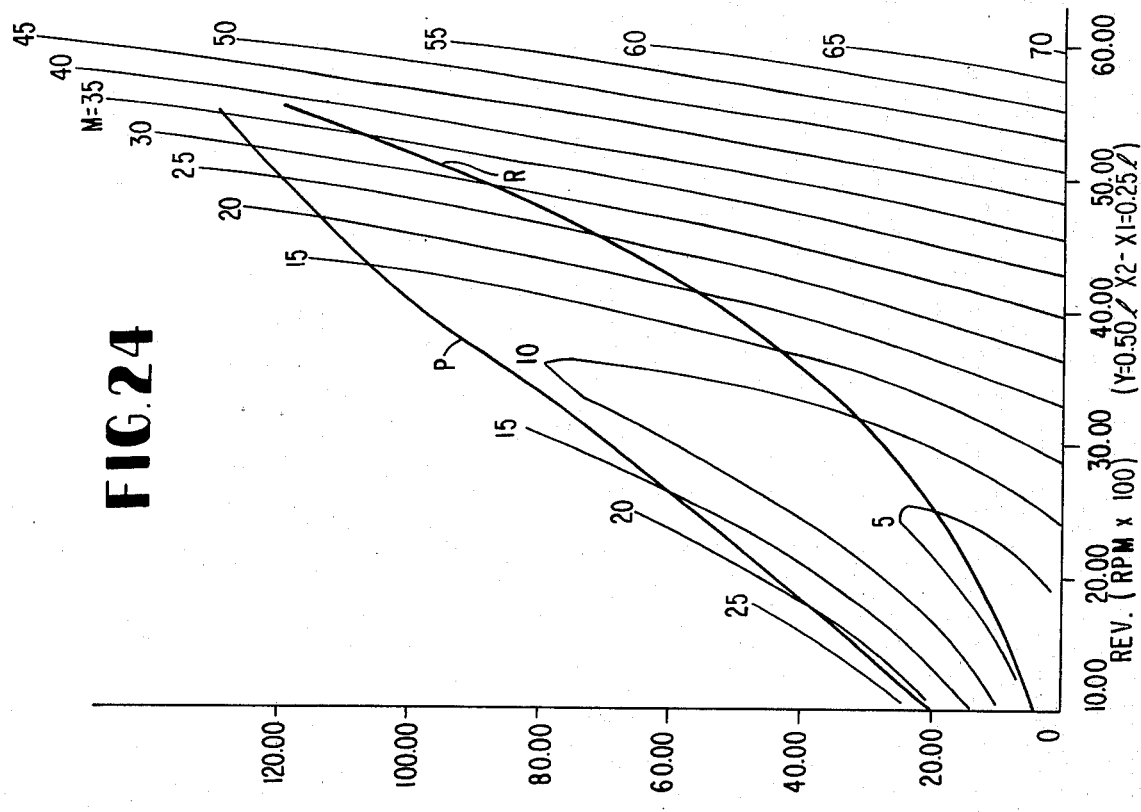
Figure 23:
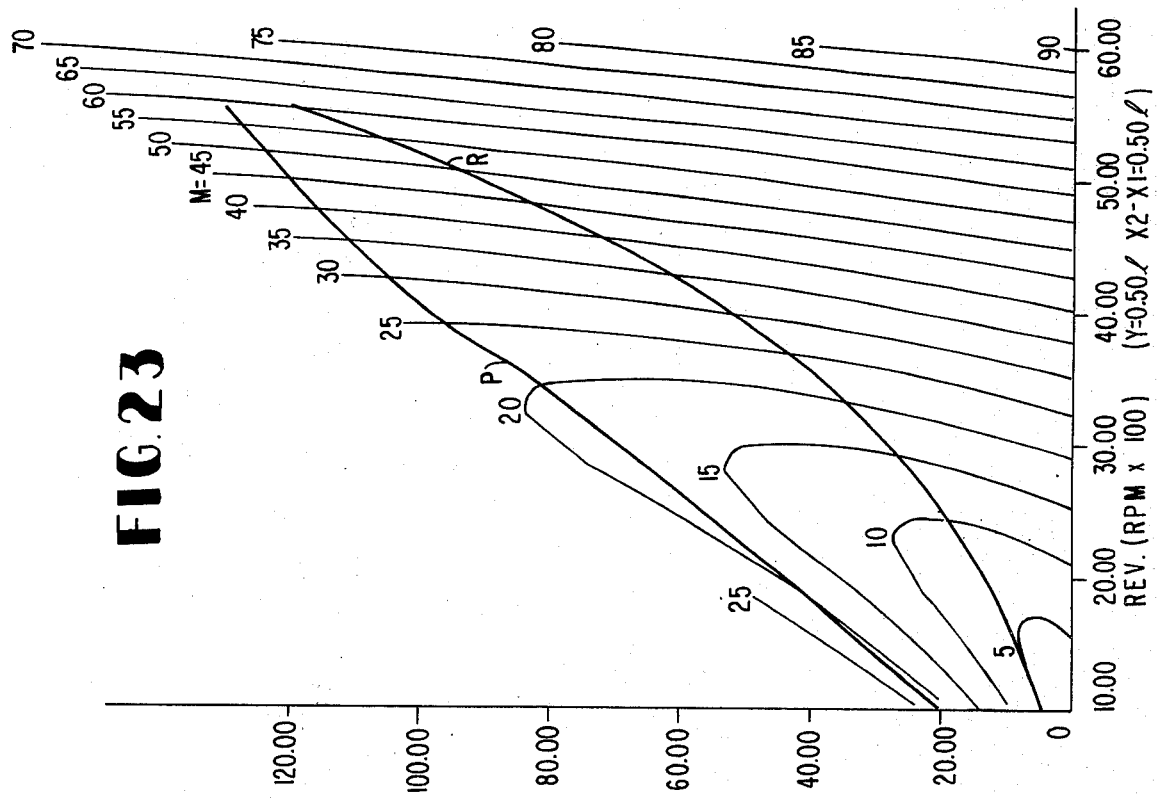
Figure 26:
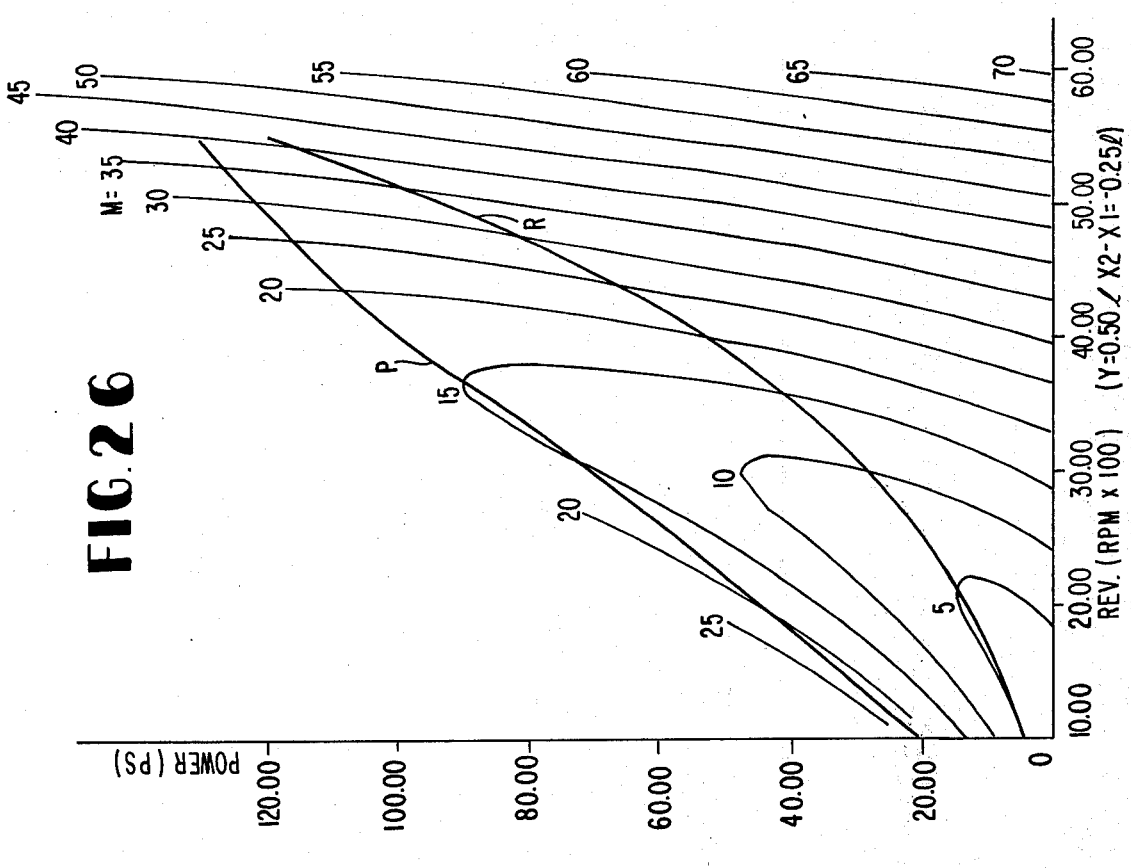
Figure 25:
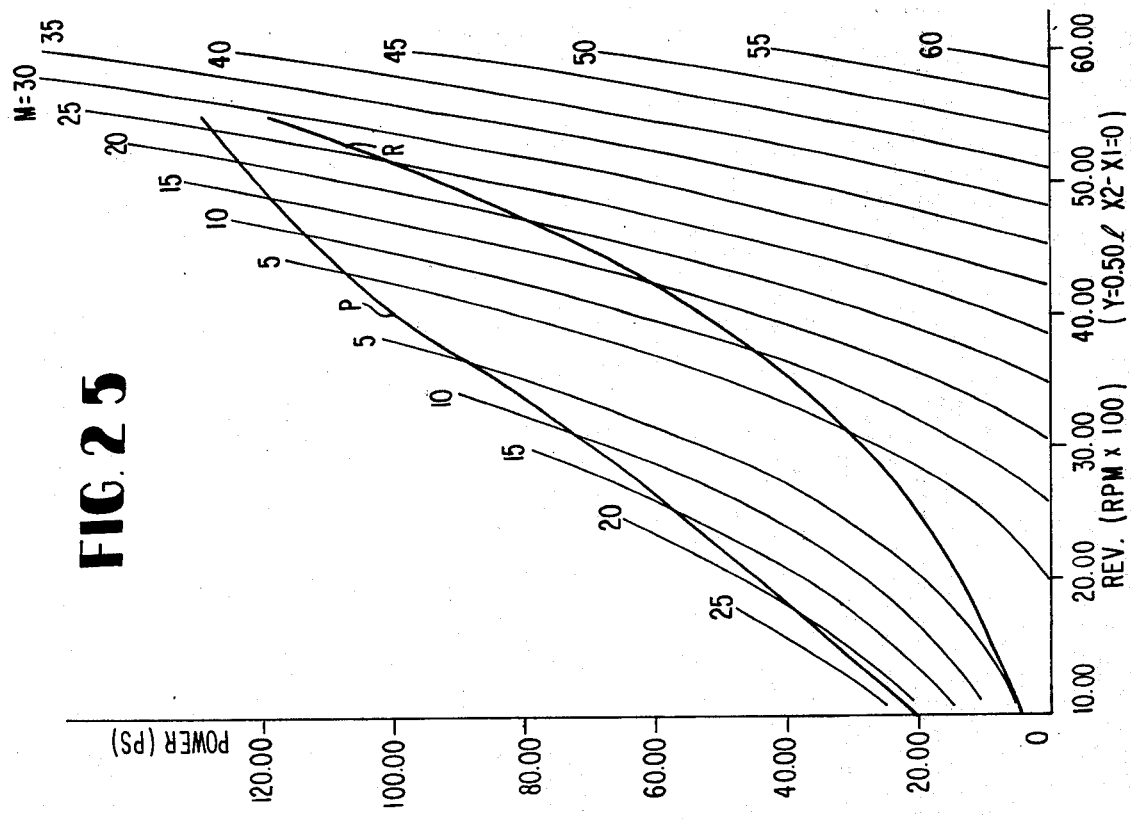
Figure 27:
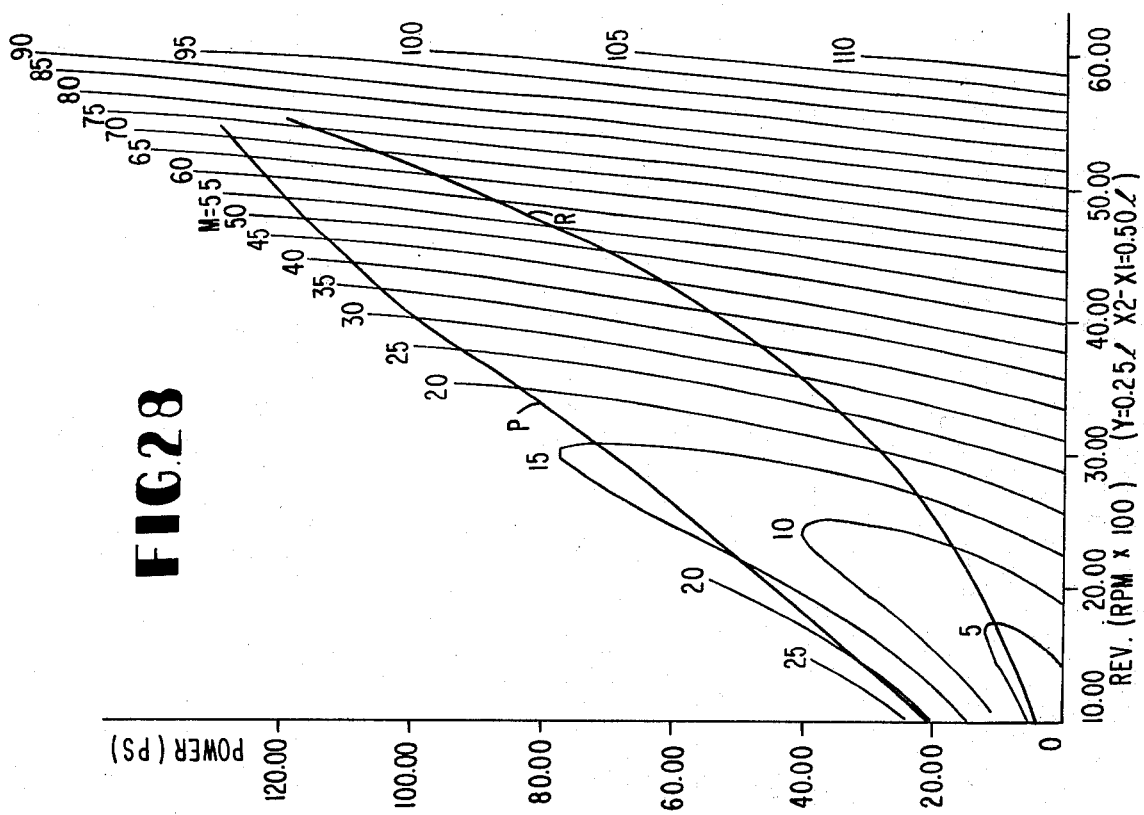
Figure 28:
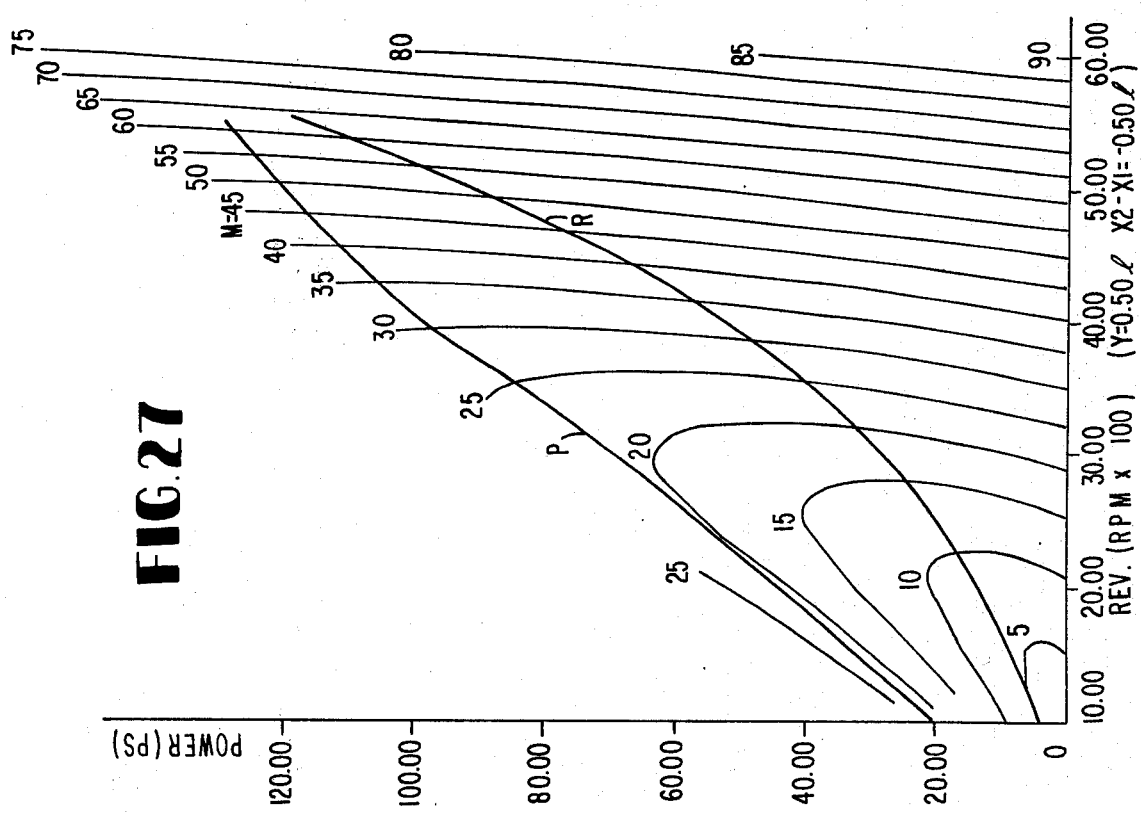
Figure 30:
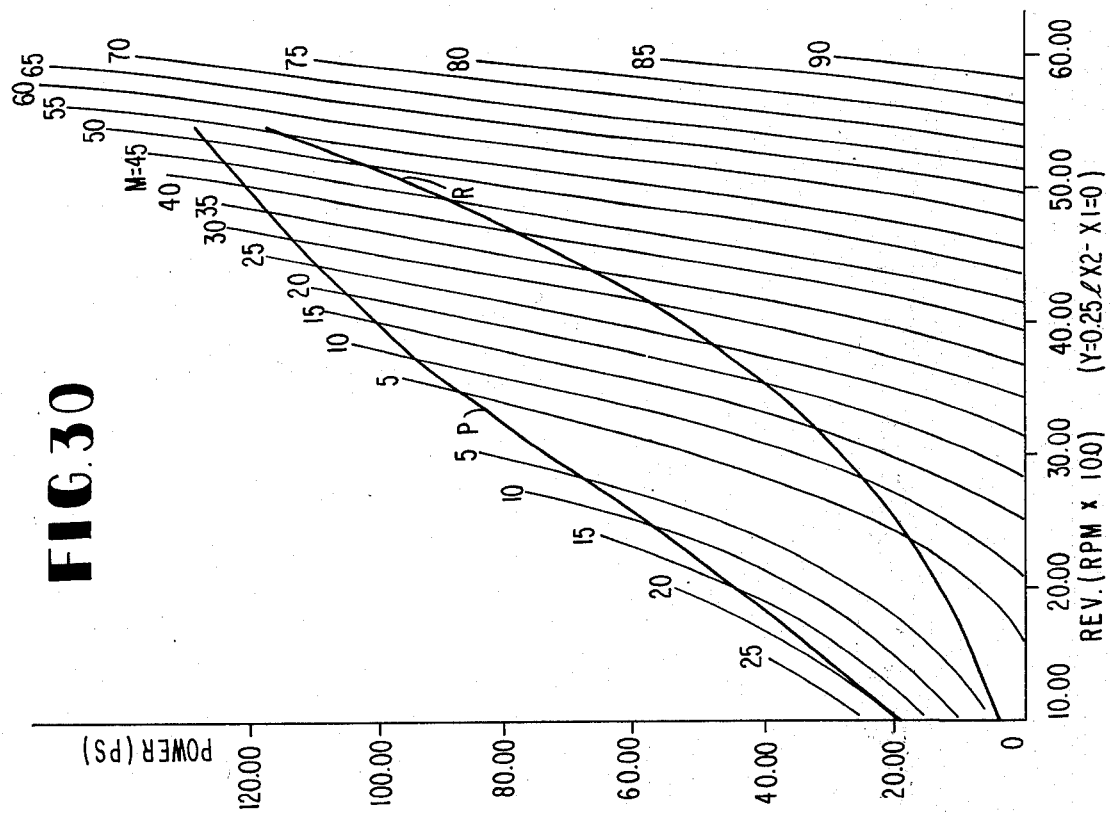
Figure 29:
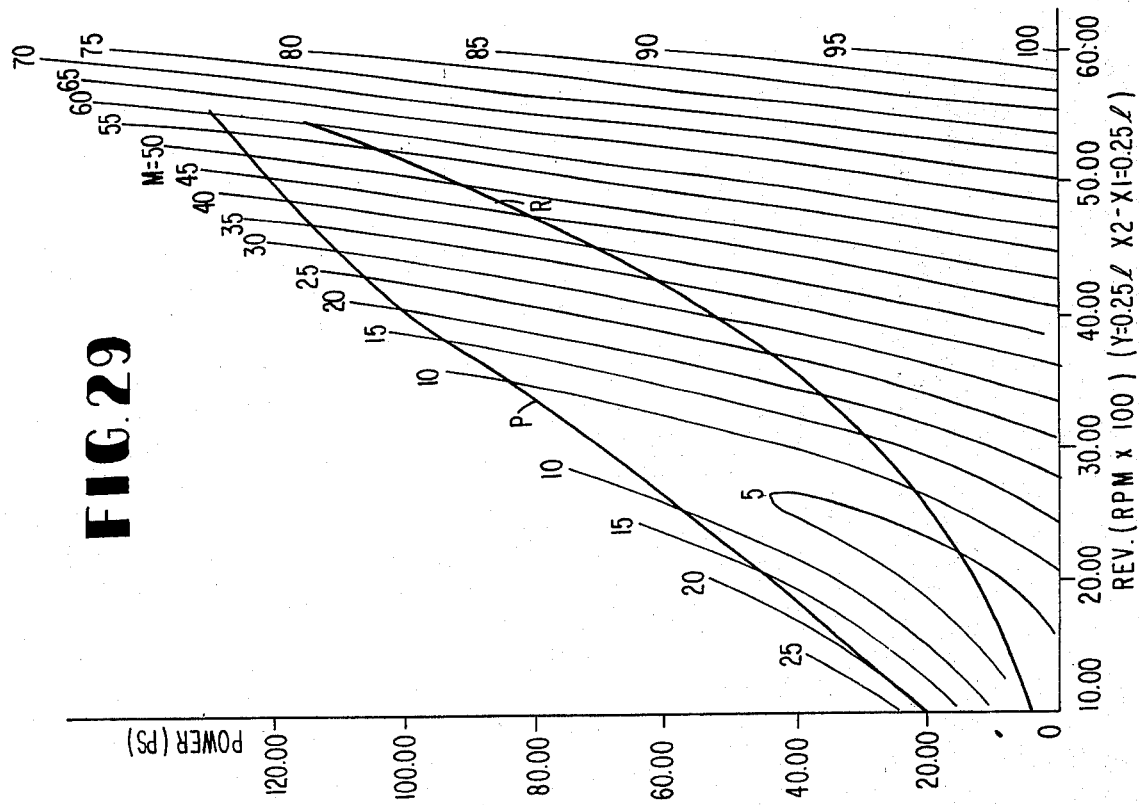
Figure 31:
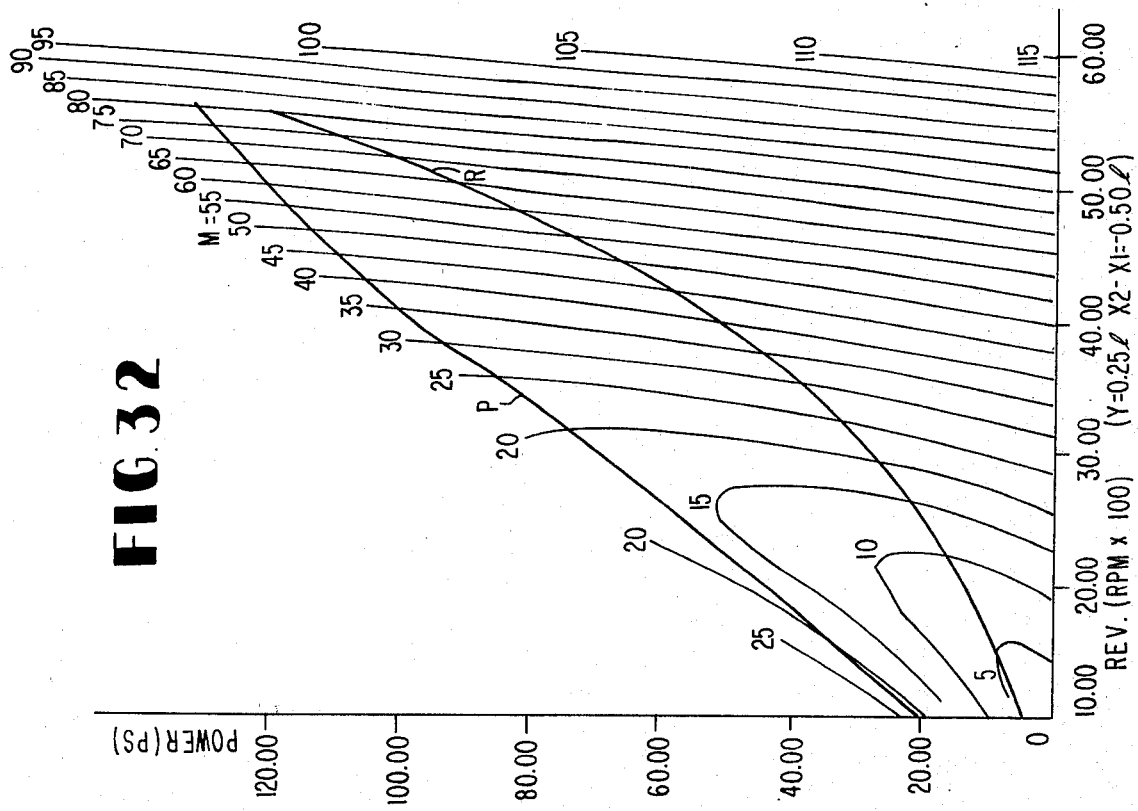
Figure 32:
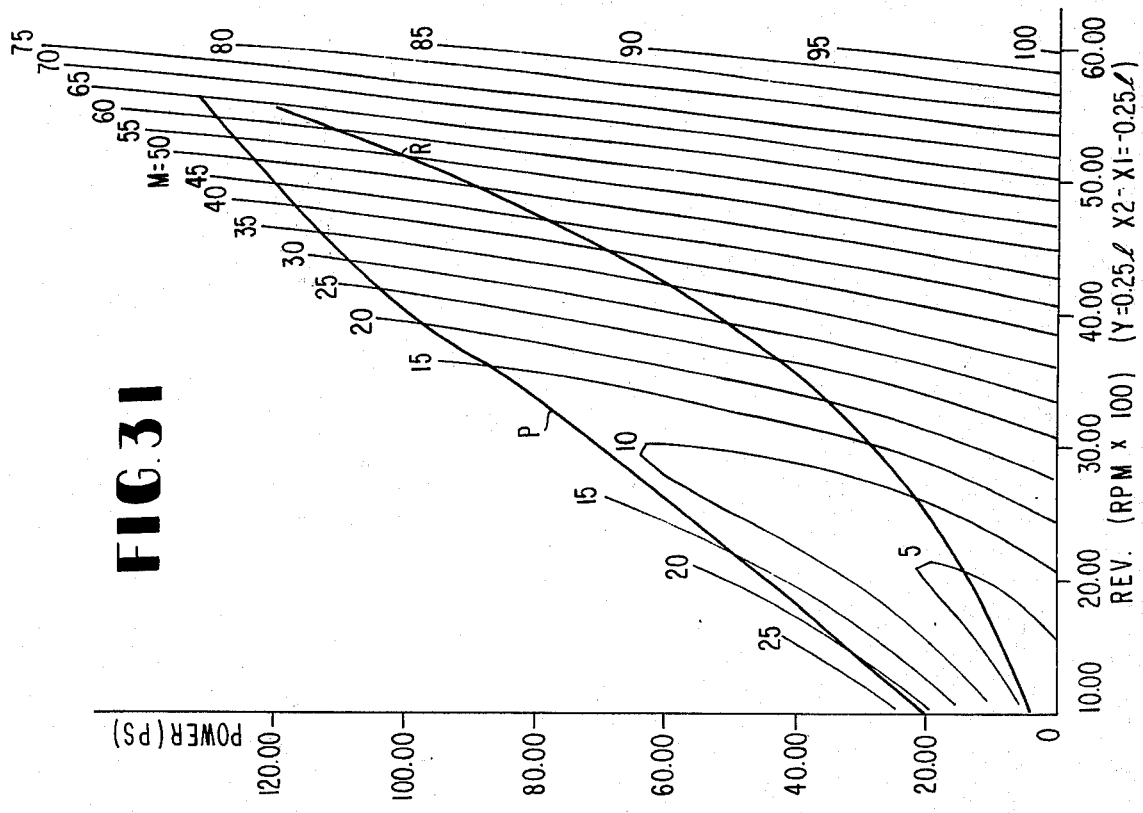
Figure 33:
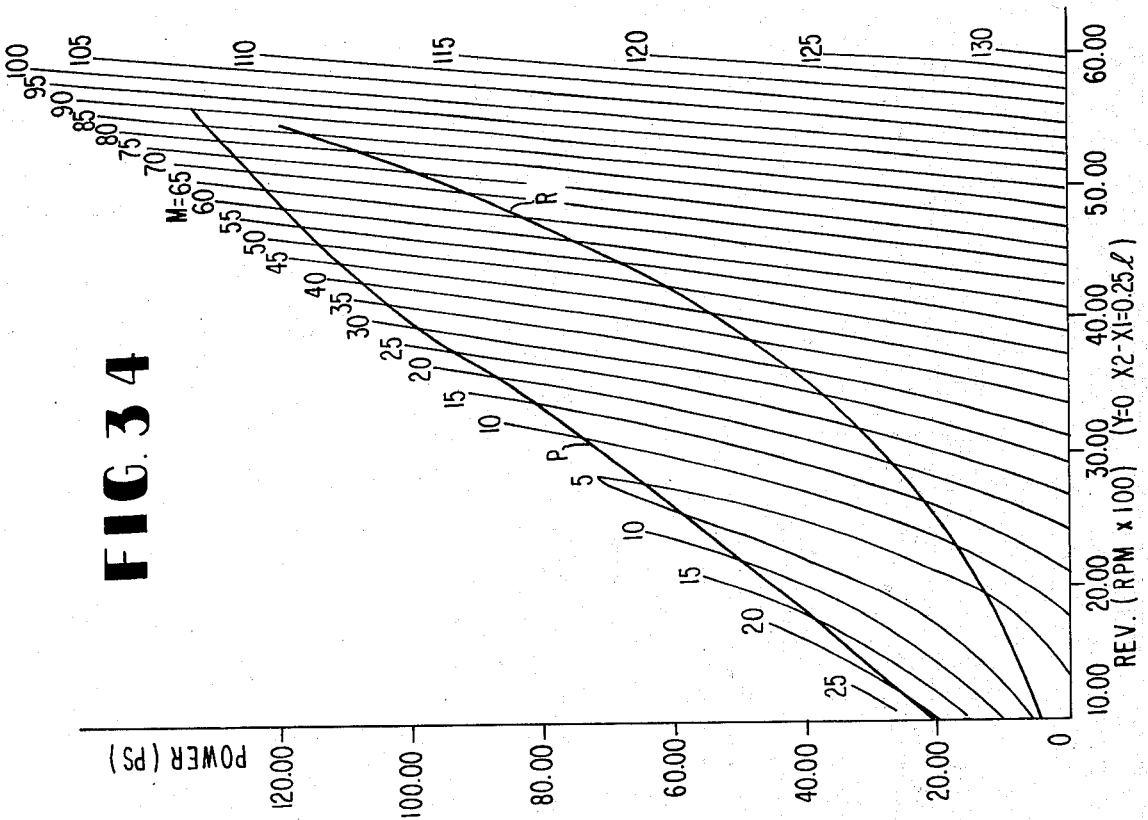
Figure 34:
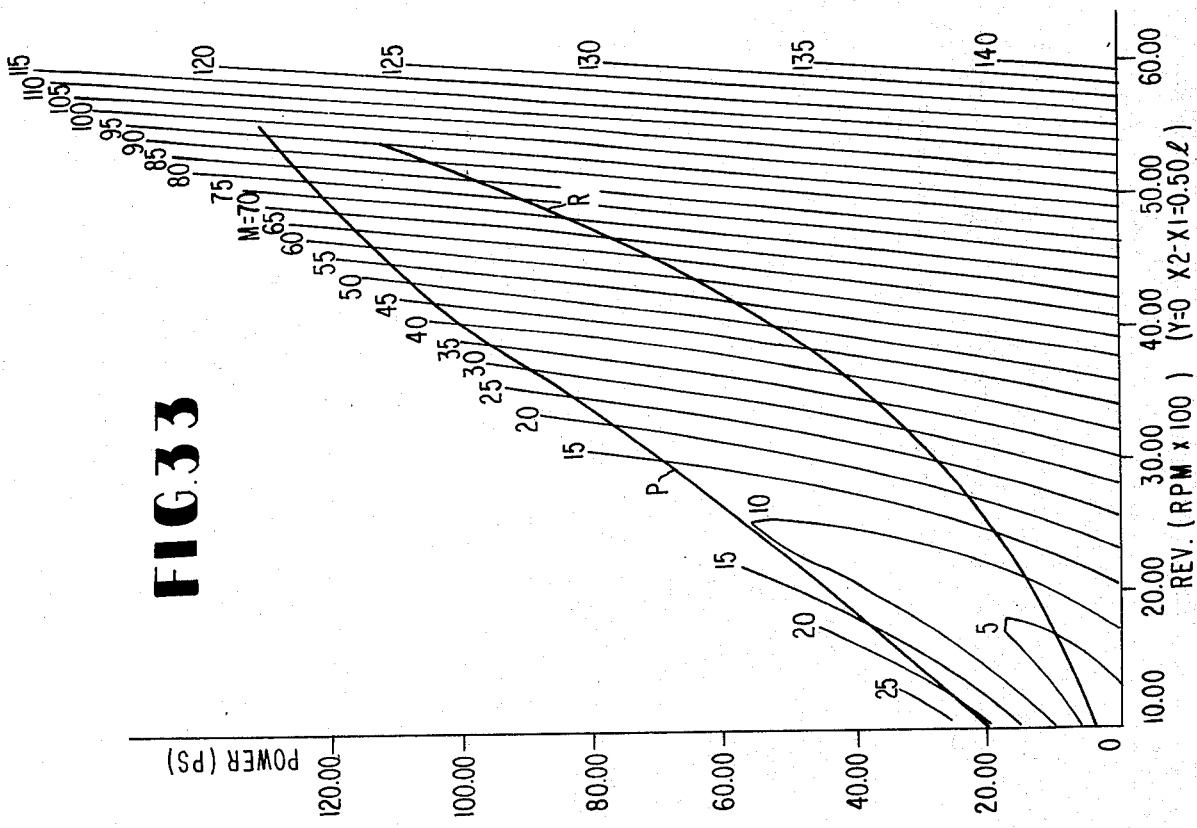
Figure 36:
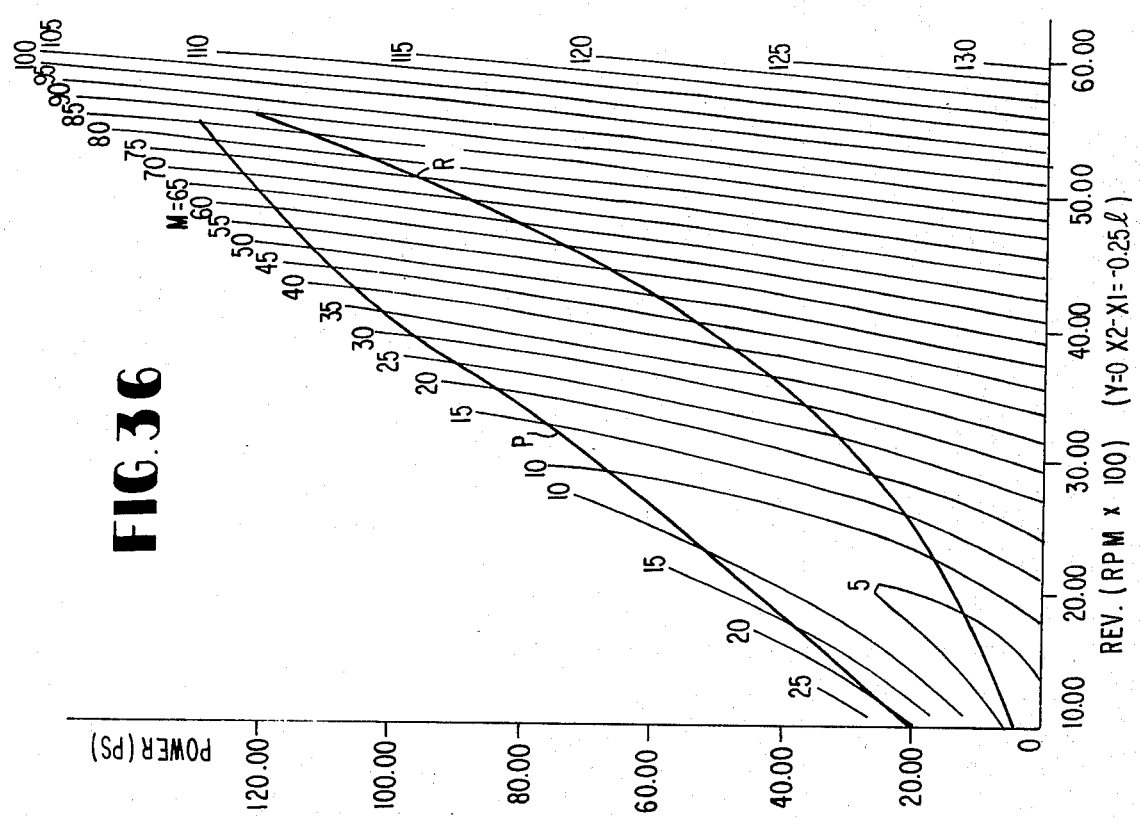
Figure 35:
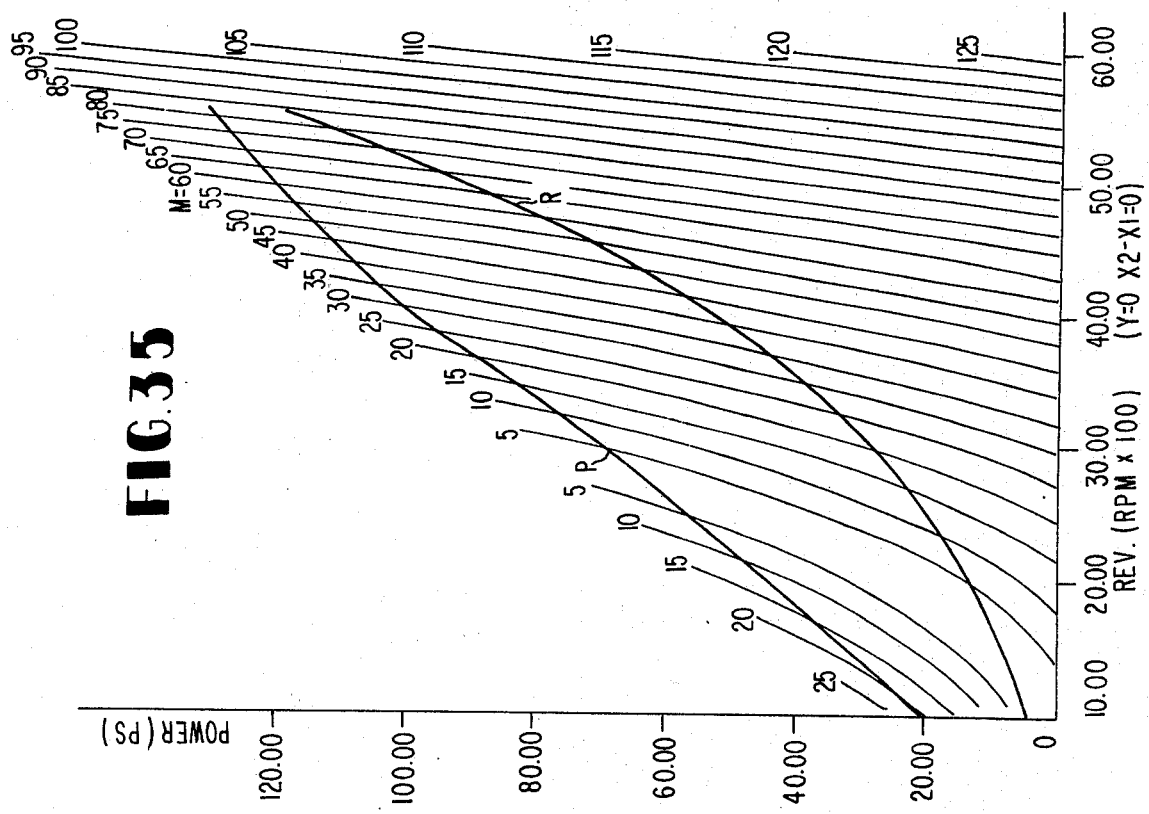

In a compact automobile having the engine equipped with the balancer device according to the present invention, more specifically, the most satisfactory balancer positioning is found, from the equi-vibromotive-moment diagrams, to reside in that the vertical distance between the paired balancer shafts has a value in the neighborhood of 75% of the length $l$ of the connecting rods, and at the same time that the distances of the righthand and lefthand balancers from the center axis of the cylinders are made equal to each other. With reference to FIG. 20, moreover, the most satisfactory balancer positioning includes the cruising resistance curve R in the area of the minimum vibromotive moment M = 5 under the condition ($y = 0.75l$, $x_2 - x_1 = 0$). Therefore, although the values for determining the most satisfactory balancer positioning will vary slightly with the variation of the size of the automobile, the type of the engine and the size of the engine, they can be selected most suitably for the particular purpose from the respective equi-vibromotive-moment diagrams.

For the industrial engine of staionary type in which the working number of rotation and the load range are substantially constant, on the other hand, the whole range of the working number of rotation need not be satisfied as is quite different from the case of the automobile engine. Thus, the most satisfactory balancer positioning can be so determined as to have the minimum engine vibrations for the intended working condition.

The same results as above can be obtained even if the present invention is applied to the four-cylinder engine of transverse type.

As has been described in detail, the straight-type four-cylinder engine according to the present invention is constructed in any combination of the following items:

a. The distance y between the paired balancers in the axial direction of the engine cylinders is determined at such desired value in the range of from 15% to 135% of the length of the connecting rods as to satisfy the engine usage and design;

b. The difference between the distances $x_1$ and $x_2$ of the balancer axes from the plane containing the longitudinal axis of the cylinders and axis of the crankshaft are also determined at such desired value in the range of $-0.5l \leq x_2 - x_1 \leq +0.5l$ (wherein $l$: length of connecting rods, $x_2$: distance between the lower balancer element and a plane containing the longitudinal axis of the cylinder and axis of the crankshaft and $x_1$: distance between the upper balancer element and said plane) as to satisfy the engine usage and design;

c. The lower one of the paired balancers is rotated in the opposite direction to the crankshaft, while the upper one is rotated in the same direction of the crankshaft; and d. In a normal case, the center of gravity of the balance weight is positioned as close as possible to the longitudinal center of the engine so as to obviate generation of the pitching moment.

Figure 39:
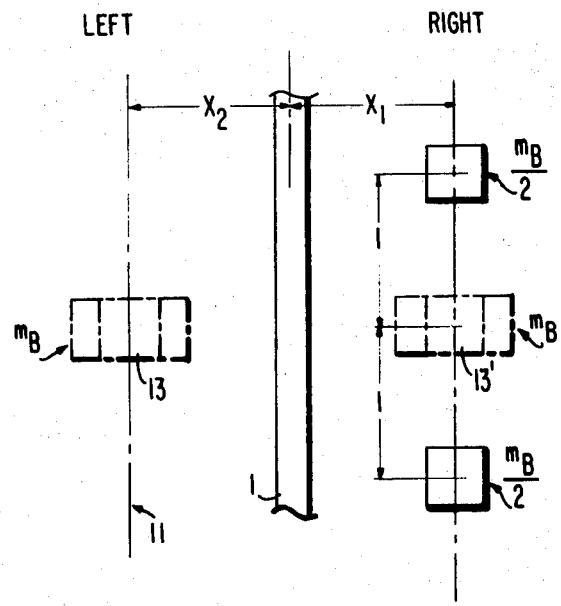
FIG. 39a shows a second embodiment of the balancer system according to the present invention.
FIG. 39b shows a third embodiment of a balancer system according to the present invention.
Figure 39:
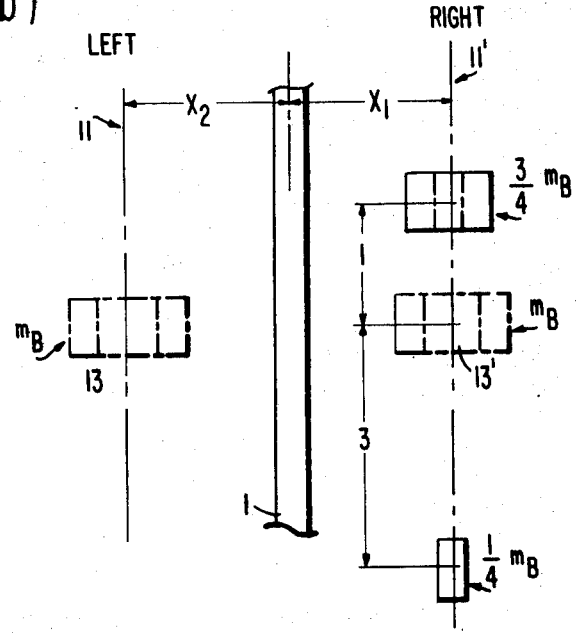

For a modification, however, the balancers may be separately arranged in the longitudinal direction of the balancer shafts, as shown in FIGS. 39(a) and 39(b). In these Figures, for example, one of the balancers is divided into halves having the same mass, and these halves are arranged equidistantly with respect to the undivided balancer. In another example, one balancer is divided into portions having different masses, and the portions are arranged in an inversely proportional fashion to the masses with respect to the undivided balancer. In these ways, the engine design can be changed in a suitable manner.

As has been described in the above, the present invention can be varied in any combination of the above items (a) to (d) and other two modifications. As a result, it should be appreciated as an advantage of the present invention that (a) the vibromotive force due to the reciprocating masses, (b) the vibromotive moment due to the reciprocating masses and (c) the vibromotive moment due to the combustion explosion can be eliminated with use of a paired balancers without drastically changing the mainbody of the conventional reciprocating engine. Thus, according to the present invention, there can be provided an engine which is remarkably simple in construction with a low production cost, and has vibrations materially reduced without reducing its performance in comparison to the conventional engine.

The engine of the present invention need not be limited to the above examples having one pair of the balancers but can have two or more pairs of the balancers.

Of course, it is believed understandable that the sideway relationship may be reversed (but the relationship between the vertical positioning and the directions of rotation of the balances has to be held constant such that the lower balancer is rotated in the opposite direction to the crankshaft) for the similar resultant effects, if such design change is within the range for achieving the objects of the present invention.

Here, although the foregoing examples are directed solely to the internal combustion engine, it should be understood that the present invention can be applied to other reciprocating engines such as a pump or a compressor with similar resultant effects.

What is claimed is:

1. In a mechanism of the type wherein at least one piston reciprocates along a longitudinal axis of at least one cylinder, said at least one piston being connected to a rotatable crankshaft via a connecting rod, the improved vibration dampening system comprising:

a. at least one pair of balancer elements rotatably supported on said mechanism, an upper balancer element of each pair being disposed laterally of an upper portion of said mechanism and a lower balancer element of each pair being disposed laterally of a lower portion of said mechanism such that the balancer elements are located on opposite sides of the cylinder and the axes of rotation of the balancer elements are parallel to the axis of rotation of the crankshaft and are located in a first plane which is disposed obliquely to a second plane containing the longitudinal axis of said cylinder and the axis of rotation of said crankshaft wherein the difference between the distance of said upper and lower balancer elements from said second plane is in the range of $-0.5l \leq X_2 - X_1 \leq +0.5l$ where:

$l$ = length of the connecting rod;
$X_2$ = distance between the lower balancer element and said second plane; and
$X_1$ = distance between the upper balancer element and said second plane, and wherein the distance between the axes of rotation of the balancer elements measured in a direction parallel to the second plane is in the range of from 15% to 135% of the length between the connecting points of the connecting rod between the piston and the crankshaft; and b. means driven by said mechanism to rotate said upper and lower balancer elements in opposite directions at twice the angular velocity of the crankshaft such that said lower balancer element is rotated in a direction opposite that of the crankshaft.

2. The improved vibration dampening system of claim 1 wherein each of said balancer elements comprises a body whose center of mass is displaced from its axis of rotation.

3. The improved vibration dampening system of claim 1 wherein the moment about the axis of rotation of the crankshaft due to the rotation of said lower balancer element is out of phase with the moment due to the movement of the piston, connecting rod and crankshaft and the moment due to the rotation of the upper balancer element is in the opposite direction from the moment due to the movement of the piston, connecting rod and crankshaft.

4. The improved vibration dampening system of claim 1 wherein said pair of balancer elements are located at the approximate longitudinal midpoint of the mechanism.

5. In an internal combustion engine of the reciprocating piston type having four cylinders wherein a piston reciprocates in each cylinder, each of the pistons being connected to a rotatable crankshaft by way of a connecting rod such that the reciprocating movement of said pistons causes rotation of said crankshaft, an improved balancer system to dampen the secondary vibromotive force due to reciprocating masses and the secondary vibromotive moments due to the reciprocating masses and the combustion forces comprising:

a. at least one pair of balancer elements rotatably supported on said engine, an upper balancer element of each pair being disposed laterally of an upper portion of said engine and a lower balancer element of each pair being disposed laterally of a lower portion of said engine such that the balancer elements are located on opposite sides of the cylinders and the axis of rotation of the balancer elements are parallel to the axis of rotation of the crankshaft and are located in a first plane which is disposed obliquely to a second plane containing the longitudinal axes of said cylinders and the axis of rotation of said crankshaft wherein the difference between the distance of said upper and lower balancer elements from said second plane is in the range of $-0.5l \leq X_2-X_1 \leq +0.5l$ where:

$l$ = length of the connecting rod;
$X_2$ = distance between the lower balancer element and said second plane; and
$X_1$ = distance between the upper balancer element and said second plane, and wherein the distance between the axes of rotation of the balancer elements measured in a direction parallel to the second plane is in the range of from 15% to 135% of the length between the points at which the connecting rods are connected to the pistons and the crankshaft; and b. means driven by said engine to rotate said upper and lower balancer elements in opposite directions at twice the angular velocity of the crankshaft such that said lower balancer element is rotated in a direction opposite that of the crankshaft.

6. The impoved vibration dampening system of claim 5 wherein all of the pistons are located on the same side of the crankshaft.

7. The improved vibration dampening system as claimed in claim 5 wherein said distance between said upper balancer element and said second plane is shorter than the length of the connecting rods, and the distance between the lower balancer element and said second plane is larger than half of the bore diameter of said cylinder.

8. The improved vibration dampening system as claimed in claim 5 wherein the sum of the distances between said upper balancer element and said second plane and between said lower balancer element and said second plane is approximately twice the length of the connecting rods.

9. The improved vibration dampening system as claimed in claim 5 wherein the distance between said lower balancer element and said second plane and the distance between said upper balancer element and said second plane are approximately equal to the length of the connecting rods, and the vertical distance between the axis of said upper balancer element and the axis of said lower balancer element is approximately equal to the length of the connecting rods.

10. The improved vibration dampening system as claimed in claim 5 wherein said distance between said upper balancer element and said second plane is shorter than the length of the connecting rods, and the distance between said lower balancer element and said second plane is larger than half of the bore diameter of said cylinder, and wherein the sum of the distances between the upper balancer element and said second plane and between the lower balancer element and said second plane is approximately twice the length of the connecting rods.

11. The improved vibration dampening system as claimed in claim 5 wherein the distance between said upper balancer element and said second plane and the distance between the lower balancer element and said second plane is longer than half of the bore diameter of the engine cylinders and the balancer elements are disposed on opposite sides of the cylinders outside of the moving locus of the connecting rod.

12. The improved vibration dampening system as claimed in claim 5 wherein the center of gravity of each of the balancer elements is centrally located along the longitudinal axis of the engine.

13. The improved vibration dampening system of claim 5 wherein one of the balancer elements is divided into halves having equal masses and these halves are disposed along the axis of rotation of said balancer element equidistantly from the undivided, balancer element.

14. The improved vibration dampening system of claim 5 wherein one of the balancer elements is divided into portions having unequal masses, and the portions are disposed along the axis of rotation of said balancer element such that the distance between each portion and the undivided balancer element is inversely proportioned to the ratio of their masses.

* * * * *

REEXAMINATION CERTIFICATE (977th)

United States Patent [19]
Nakamura et al.

[11] B1 3,995,610
[45] Certificate Issued  Jan. 3, 1989

[54] FOUR CYLINDER STRAIGHT-TYPE ENGINE WITH SECONDARY BALANCER SYSTEM

[75] Inventors: Hirokazu Nakamura; Mitsutaka Kinoshita, both of Kyoto; Tadahiko Ito, Nagaokakyo; Kazumasa Kawata, Kyoto, all of Japan

[73] Assignee: Mitsubishi Jidosha Kogyo Kabushiki Kaisha, Tokyo, Japan

Reexamination Request:
No. 90/001,074, Aug. 25, 1986

Reexamination Certificate for:
Patent No.: 3,995,610
Issued: Dec. 7, 1976
Appl. No.: 527,780
Filed: Nov. 27, 1974

[30] Foreign Application Priority Data
Nov. 27, 1973 [JP]  Japan ............................... 48-133873
Apr. 5, 1974 [JP]  Japan ............................... 49-38665

[51] Int. Cl.$^4$ ................................................. F22B 5/00
[52] U.S. Cl. ..................................... 123/192 B; 74/604
[58] Field of Search ...................... 123/192 R, 192 B; 74/604

[56] References Cited

U.S. PATENT DOCUMENTS
2,304,892  12/1942  Dickson .................................. 74/604
2,566,476  9/1951  Zuhn ...................................... 74/604
3,667,317  6/1972  Hillingrathner ......................... 74/604

FOREIGN PATENT DOCUMENTS
1070441  12/1959  Fed. Rep. of Germany .
2147213  5/1973  Fed. Rep. of Germany .
1106744  5/1954  France .

OTHER PUBLICATIONS
DE-Z Grundlagin der Landtechnik Band 15/1965/Nr. 1, 5.2-10.
German Utility Model 1,726,587 dated May 16, 1953 and published Jul. 19, 1956.

*Primary Examiner*—Ronald C. Capossela

[57] ABSTRACT

A four cylinder in-line engine is disclosed with a secondary balancer system, wherein at least one pair of balancer elements are arranged substantially at an identical horizontal distance from the longitudinal axes of the engine cylinders and on lines which are substantially parallel to the plane of the longitudinal axes. The distance taken between the axes of the paired balancer elements in the direction of the cylinder axes is determined at such desired values as to satisfy the engine usage and design. The paired balancer elements are rotated in the opposite directions to each other with a speed of rotation twice as high as that of the engine [crackshaft] *crankshaft*, such that the lower balancer element is rotated in the opposite direction to that of the engine [crackshaft] *crankshaft*.

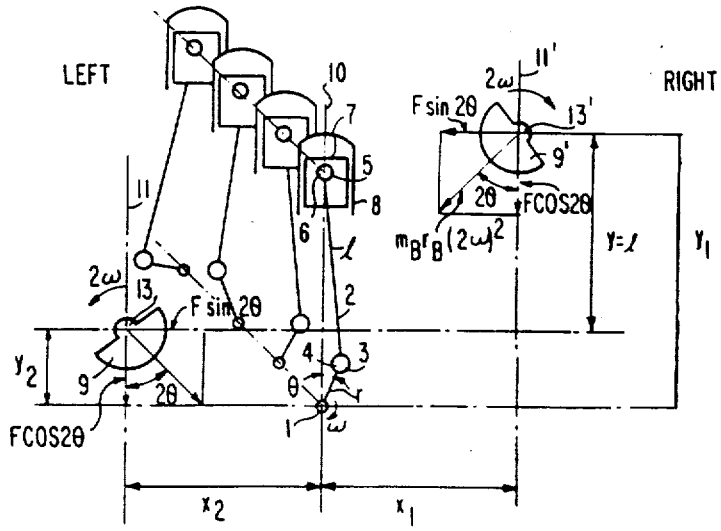

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-4 are cancelled.

Claim 5 is determined to be patentable as amended.

Claims 6-14, dependent on an amended claim, are determined to be patentable.

5. In [an] *a four cycle* internal combustion engine of the reciprocating piston type having four cylinders wherein a piston reciprocates in each cylinder, each of the pistons being connected to a rotatable crankshaft by way of a connecting rod such that the reciprocating movement of said pistons causes rotation of said crankshaft, an improved balancer system to dampen the secondary vibromotive force due to reciprocating masses and the secondary vibromotive moments due to the reciprocating masses and the combustion forces comprising:

a. at least one pair of balancer elements rotatably supported on said engine, an upper balancer element of each pair being disposed laterally of an upper portion of said engine and a lower balancer element of each pair being disposed laterally of a lower portion of said engine such that the balancer elements are located on opposite sides of the cylinders and the axis of rotation of the balancer elements are parallel to the axis of rotation of the crankshaft and are located in a first plane which is disposed obliquely to a second plane containing the longitudinal axes of said cylinders and the axis of rotation of said crankshaft wherein the difference between the distance of said upper and lower balancer elements from said second plane is in the range of $-0.5l \leq X_2 - X_1 \leq +0.5l$ where:
 $l$ = length of the connecting rod;
 $X_2$ = distance between the lower balancer element and said second plane; and
 $X_1$ = distance between the upper balancer element and said second plane, and wherein the distance between the axes of rotation of the balancer elements measured in a direction parallel to the second plane is in the range of from 15% to 135% of the length between the points at which the connecting rods are connected to the pistons and the crankshaft; and b. means driven by said engine to rotate said upper and lower balancer elements in opposite directions at twice the angular velocity of the crankshaft such that said lower balancer element is rotated in a direction opposite that of the crankshaft.

* * * * *